United States Patent
Kwon et al.

(10) Patent No.: US 10,347,971 B2
(45) Date of Patent: Jul. 9, 2019

(54) ELECTRONIC DEVICE INCLUDING ANTENNA

(71) Applicant: SAMSUNG ELECTRONICS CO., LTD., Suwon-si, Gyeonggi-do (KR)

(72) Inventors: Min Young Kwon, Gimhae-si (KR); Seung Hyun Yeo, Daegu (KR); Jung Min Lee, Daegu (KR); Hyun Su Lee, Daegu (KR); Soon Sang Park, Daegu (KR); Hyun Suk Choi, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 145 days.

(21) Appl. No.: 15/480,583

(22) Filed: Apr. 6, 2017

(65) Prior Publication Data

US 2017/0331175 A1 Nov. 16, 2017

(30) Foreign Application Priority Data

May 13, 2016 (KR) .................. 10-2016-0059104

(51) Int. Cl.
*H01Q 1/24* (2006.01)
*H01Q 9/42* (2006.01)
*H04B 1/3827* (2015.01)
*H01Q 21/28* (2006.01)

(52) U.S. Cl.
CPC .............. *H01Q 1/245* (2013.01); *H01Q 9/42* (2013.01); *H01Q 21/28* (2013.01); *H04B 1/3838* (2013.01)

(58) Field of Classification Search
CPC .......... H01Q 1/245; H01Q 21/28; H01Q 9/42; H04B 1/3838
USPC ........................................................ 343/718
See application file for complete search history.

(56) References Cited

U.S. PATENT DOCUMENTS

| | | | | |
|---|---|---|---|---|
| 8,086,202 | B2* | 12/2011 | Ejima | H01Q 1/521 455/139 |
| 8,548,496 | B2 | 10/2013 | Tai | |
| 10,098,038 | B2* | 10/2018 | Wen | H04W 4/80 |
| 10,104,493 | B2* | 10/2018 | Wang | H04W 4/02 |
| 10,109,918 | B2* | 10/2018 | Thill | H01Q 5/357 |
| 2012/0322378 | A1 | 12/2012 | Tai | |

FOREIGN PATENT DOCUMENTS

KR 10-2014-0043815 4/2014
KR 10-2015-0128250 11/2015

* cited by examiner

*Primary Examiner* — Brian K Young
(74) *Attorney, Agent, or Firm* — Nixon & Vanderhye P.C.

(57) ABSTRACT

An electronic device is provided. The electronic device includes a first antenna, a first feeding line electrically connected to the first antenna, a second antenna, a second feeding line electrically connected to the second antenna element, a conductive line connecting a point of the first antenna or the first feeding line and a point of the second antenna or the second feeding line, and a sensor module electrically connected to a point of at least one of the first antenna element, the second antenna element, the first feeding line, the second feeding line, and the conductive line.

19 Claims, 16 Drawing Sheets

ELECTRONIC DEVICE INCLUDING ANTENNA

CROSS-REFERENCE TO RELATED APPLICATION

This application is based on and claims priority under 35 U.S.C. § 119 to a Korean patent application filed on May 13, 2016 in the Korean Intellectual Property Office and assigned Serial number 10-2016-0059104, the entire disclosure of which is incorporated by reference herein in its entirety.

TECHNICAL FIELD

The present disclosure relates generally to an electronic device including an antenna.

BACKGROUND

Nowadays, a demand for a mobile communication service is increasing rapidly as a mobile communication system is rapidly developed. Also, as a demand for a service using wireless communications increases, supply of an electronic device including a wireless communication module increases. There is a trend in which an electronic device supporting wireless communications becomes simple, thin, and lightweight to secure efficient mobility of a system. An antenna for wireless communications that has simple, thin, and lightweight characteristics while satisfying a high-gain characteristic is being required.

Meanwhile, if transmission power of the antenna increases to improve transmission performance of the antenna, a rate (hereinafter referred to as a "specific absorption rate (SAR)") at which electromagnetic waves are absorbed into a human body may increase. Since high SAR has a bad influence on the human body, an electronic device including an antenna needs to comply with a reference value of the SAR.

When a conventional electronic device transmits signals using an antenna, the electronic device may reduce transmission power of the antenna if a part of a user's body is approaching. To this end, the conventional electronic device may form a grip sensor using a radiator pattern of the antenna and may sense an approach of the human body based on the grip sensor.

However, in the case where a length of the radiator pattern of the antenna is short, a sensing area of the grip sensor using the radiator pattern may become smaller. In this case, the electronic device may fail to sense an approach of the human body precisely.

SUMMARY

Example aspects of the present disclosure address at least the above-mentioned problems and/or disadvantages and provide at least the advantages described below. Accordingly, an example aspect of the present disclosure is to provide an electronic device that senses an approach of a human body by connecting a plurality of antennas with a conductive line and using the conductive line and at least one of the antennas connected with the conductive line.

In accordance with an example aspect of the present disclosure, an electronic device includes a first antenna element, a first feeding line electrically connected with the first antenna element, a second antenna element, a second feeding line electrically connected with the second antenna element, a conductive line connecting a point of the first antenna element or the first feeding line and a point of the second antenna element or the second feeding line, and a sensor module electrically connected with a point of at least one of the first antenna element, the second antenna element, the first feeding line, the second feeding line, and the conductive line.

In accordance with another example aspect of the present disclosure, an electronic device includes a housing including a first surface facing a first direction, a second surface facing a second direction opposite the first direction, and a side surface surrounding at least a part of a space formed between the first surface and the second surface, a first antenna element, a second antenna element, a first feeding line electrically connected with the first antenna element, a second feeding line electrically connected with the second antenna element, a first communication module comprising communication circuitry connected with the first feeding line and configured to transmit and receive a signal of a first frequency band, a second communication module comprising communication circuitry connected with the second feeding line and configured to transmit and receive a signal of a second frequency band, a conductive line connecting a point of the first feeding line and a point of the second feeding line, a printed circuit board disposed inside the housing, a sensor module disposed on the printed circuit board and electrically connected with a point of the conductive line, and a processor disposed on the printed circuit board and operatively connected with the sensor module.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
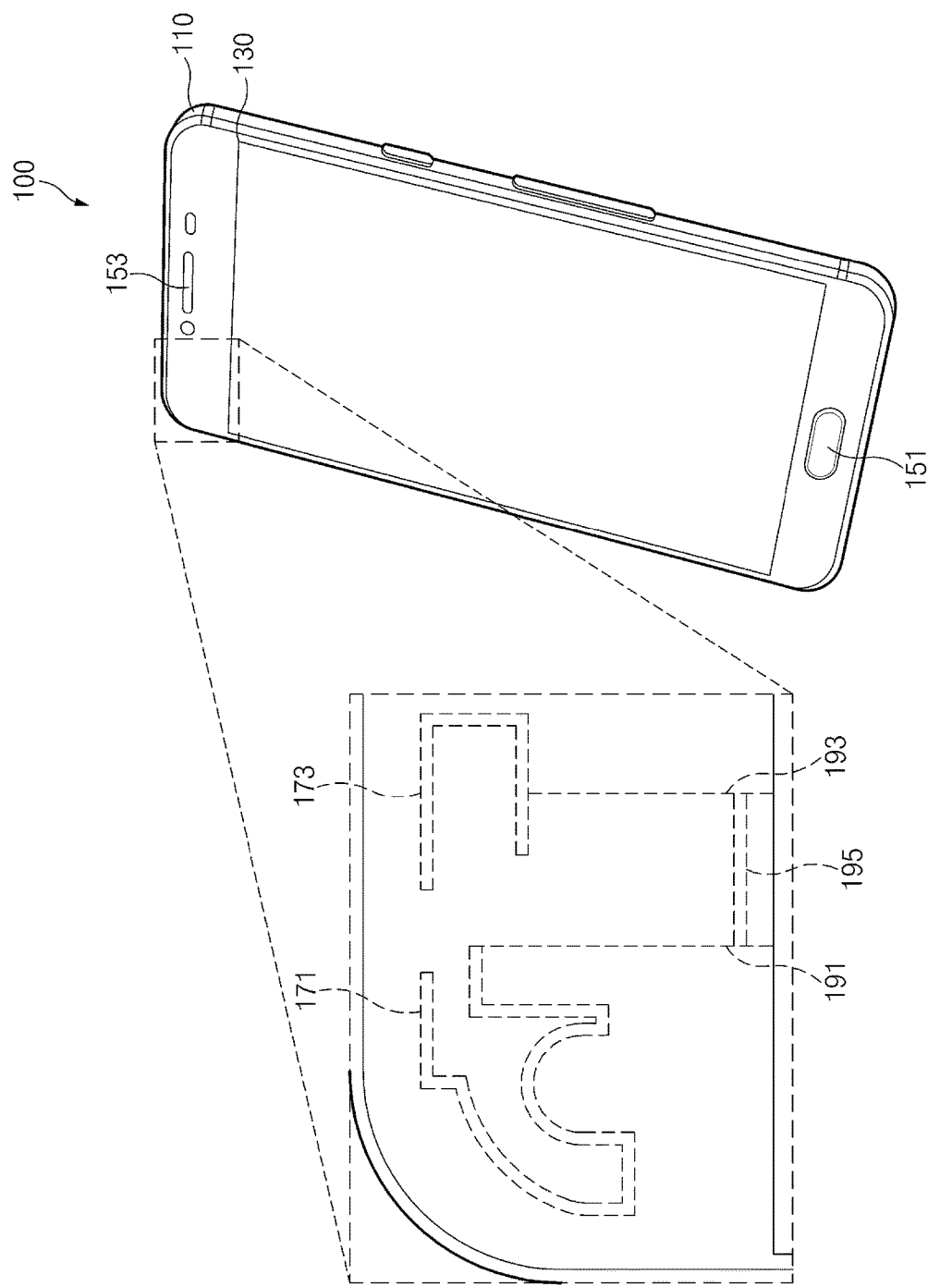
FIG. 1 is a diagram including a perspective view of an example electronic device including an antenna, according to an example embodiment.

Hereinafter, various example embodiments of the present disclosure are disclosed with reference to the accompanying drawings. However, the present disclosure is not intended to be limited by the various example embodiments of the present disclosure to any specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used to enable a clear and consistent understanding of the present disclosure. Accordingly, it should be apparent to those skilled in the art that the following description of various example embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may refer to a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device, or the like, but is not limited thereto. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit), or the like, but is not limited thereto.

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame, or the like, but is not limited thereto.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like), or the like, but is not limited thereto.

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like), or the like, but is not limited thereto. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a diagram including a perspective view illustrating an example electronic device including an antenna, according to an example embodiment.

According to various embodiments, an electronic device 100 including an antenna may support wireless communications. When the electronic device 100 transmits signals using the antenna for the wireless communications, the electronic device 100 may reduce transmission power of the antenna if a part of a user's body is approaching. For example, the electronic device 100 may sense an approach of a part of the body based on a sensor module (e.g., a grip sensor) and may reduce the transmission power of the antenna if it is determined that the part of the body is approaching.

According to an embodiment, the electronic device 100 may include a sensor module for sensing an approach of the part of the body using the antenna. The electronic device 100 may form the sensor module using a conductive line (or a conductive pattern) 195 connecting a plurality of antennas and the antennas connected with the conductive line 195. In this case, a sensing area of the sensor module may be extended. This may mean that more exact sensing is possible.

Referring to FIG. 1, the electronic device 100 that performs the above-described function may include a housing 110 and a display 130. The housing 110 may include a front surface, a rear surface, and a side surface at least partially surrounding a space between the front surface and the rear surface. The housing 110 may form an appearance of the electronic device 100 and may fix and support at least one internal component (e.g., the display 130) of the electronic device 100. The housing 110 may include at least one hole such that at least one internal component is exposed to the outside of the electronic device 100. For example, the housing 110 may include a hole such that a physical key (e.g., a home button 151, a speaker (e.g., a receiver 153), or the like) is exposed to the outside.

A plurality of antennas may be disposed inside the housing 110. A first antenna 171 and a second antenna 173 are illustrated in FIG. 1 as being disposed inside a left upper end of the housing 110. However, a location at which antennas are disposed is not limited thereto. In any embodiment, at least one of the antennas may be disposed inside a right upper end, a left lower end, or a right lower end of the inside of the housing 110, and at least another antenna may be further disposed inside the housing 110. As another example, the housing 110 may include a metal frame in at least a partial area, and at least part of the metal frame may be used as an antenna.

A plurality of antennas (e.g., the first antenna 171 and the second antenna 173) may be connected with the conductive line 195. For example, the conductive line 195 may be connected to feeding lines of the antennas. The conductive line 195 is illustrated in FIG. 1 as connecting a feeding line 191 of the first antenna 171 and a feeding line 193 of the second antenna 173. A sensor module for sensing an approach of a part of the user's body may be composed of the conductive line 195 and at least one of the first antenna 171 and the second antenna 173 connected with the conductive line 195.

For example, the sensor module may measure a physical quantity or may sense an operational status of the electronic device 100. The sensor module may convert the measured or sensed information into an electrical signal. The sensor module may include a grip sensor, a proximity sensor, or the like. The sensor module may further include a control circuit for controlling at least one or more sensors that belong to the sensor module. The sensor module may sense a contact or proximity of a touch object (e.g., a part of the user's body). According to an embodiment, the sensor module may operate in a capacitive way. For example, the sensor module may sense a contact or proximity of a touch object by using a change in capacitance that occurs when the touch object makes contact with a sensing electrode formed of a conductive material. In this case, the sensing electrode may include the conductive line 195 and at least one of the first antenna 171 and the second antenna 173 connected with the conductive line 195.

Although not illustrated in FIG. 1, the plurality of antennas may be connected to a communication module (e.g., a communication circuit). The communication module may include various communication circuitry to establish communication between the electronic device 100 and an external electronic device. The communication module may connect to a network through wireless communications or wired communications to communicate with the external electronic device.

The display 130 may display various content (e.g., texts, images, video, icons, symbols, or the like) to a user. The display 130 may be seated inside the housing 110. In any embodiment, a cover layer (e.g., a front cover) may be disposed on the display 130. The cover layer may be connected with one surface of the housing in such a way that the display 130 is covered by the cover layer. In this case, the cover layer may form part (e.g., a front appearance) of the appearance of the electronic device 100. According to an embodiment, at least part of the cover layer may be formed of a transparent material (e.g., glass) such that a screen output to the display 130 is exposed to the outside through a transparent area of the cover layer.

A configuration of the electronic device 100 is not limited thereto. According to various embodiments, the electronic device 100 may further include at least another component in addition to the aforementioned components. For example, the electronic device 100 may include a processor, a memory, or an input/output interface.

The processor may include various processing circuitry and perform operations or data processing associated with control and/or communication of at least another component of the electronic device 100. The processor may drive, for example, an operating system (OS) or an application to control a plurality of hardware or software components connected to the processor and to process a variety of data. The processor may be implemented with a System on Chip (SoC), for example.

If an approach of a part of the user's body is sensed based on the sensor module, the processor may reduce transmission power of an antenna. For example, in the case where a capacitance change signal received from the sensor module reaches a threshold value, the processor may reduce power being supplied to at least one of the first antenna 171 and the second antenna 173. Accordingly, it may be possible to reduce a specific absorption rate. For example, in the case where a user makes the electronic device 100 get toward his/her head for a voice call, the processor may sense the case to reduce power being supplied to the first antenna 171 and the second antenna 173. Accordingly, it may be possible to reduce a rate at which electromagnetic waves are absorbed into the human body.

The memory may store commands or data associated with at least one other component(s) of the electronic device 100. According to an embodiment, the memory may store software and/or a program. According to various embodiments, the memory may include an internal (or embedded) memory or an external memory.

The input/output interface may include various circuitry to transmit commands or data input from the user or any other external device to any other component(s) of the electronic device 100 or may output commands or data received from any other component(s) of the electronic device 100 to the user or the other external device.

Figure 2A:
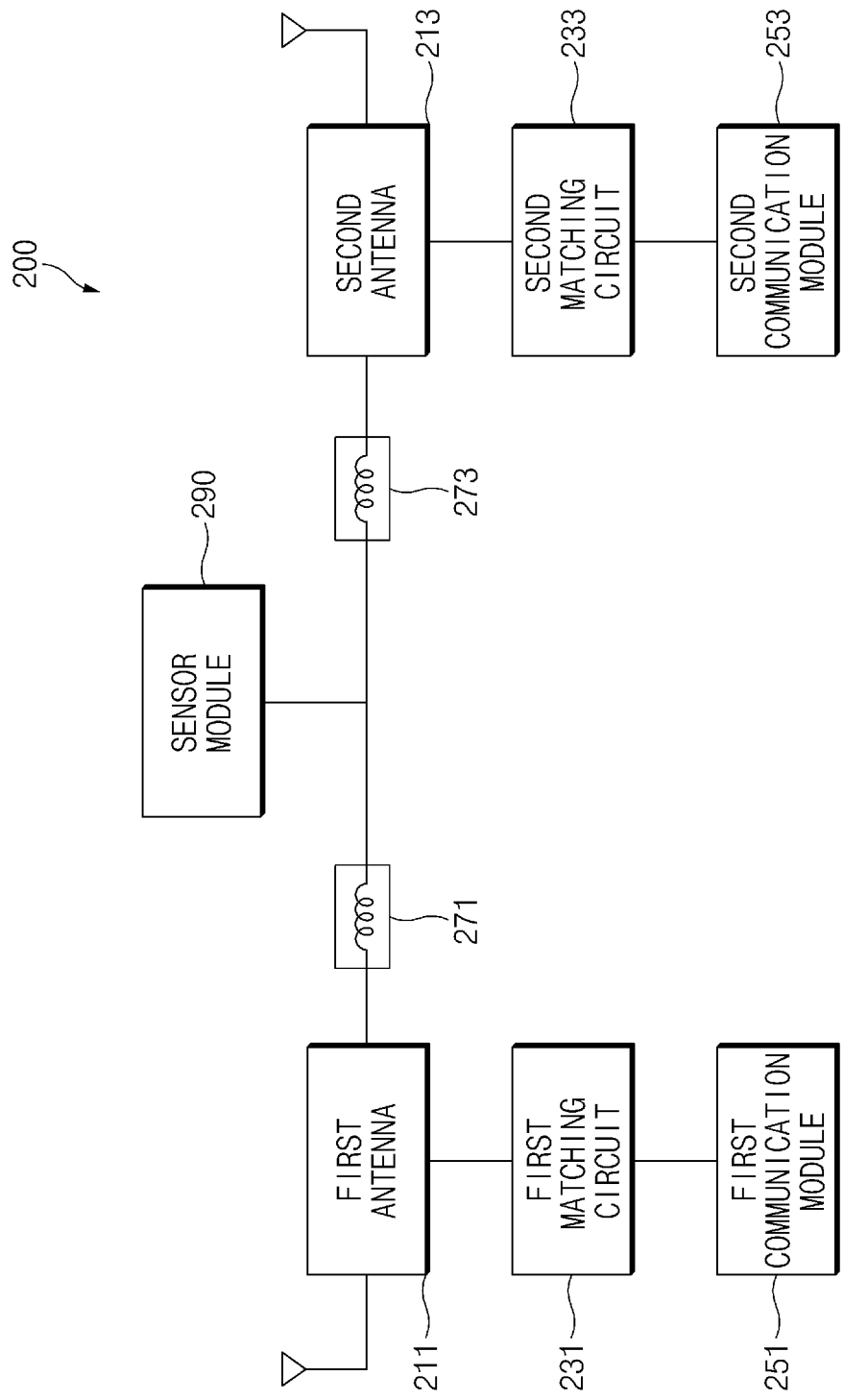
FIG. 2A is a block diagram illustrating an example configuration of a sensor module using a plurality of antennas, according to an example embodiment.
Figure 2B:
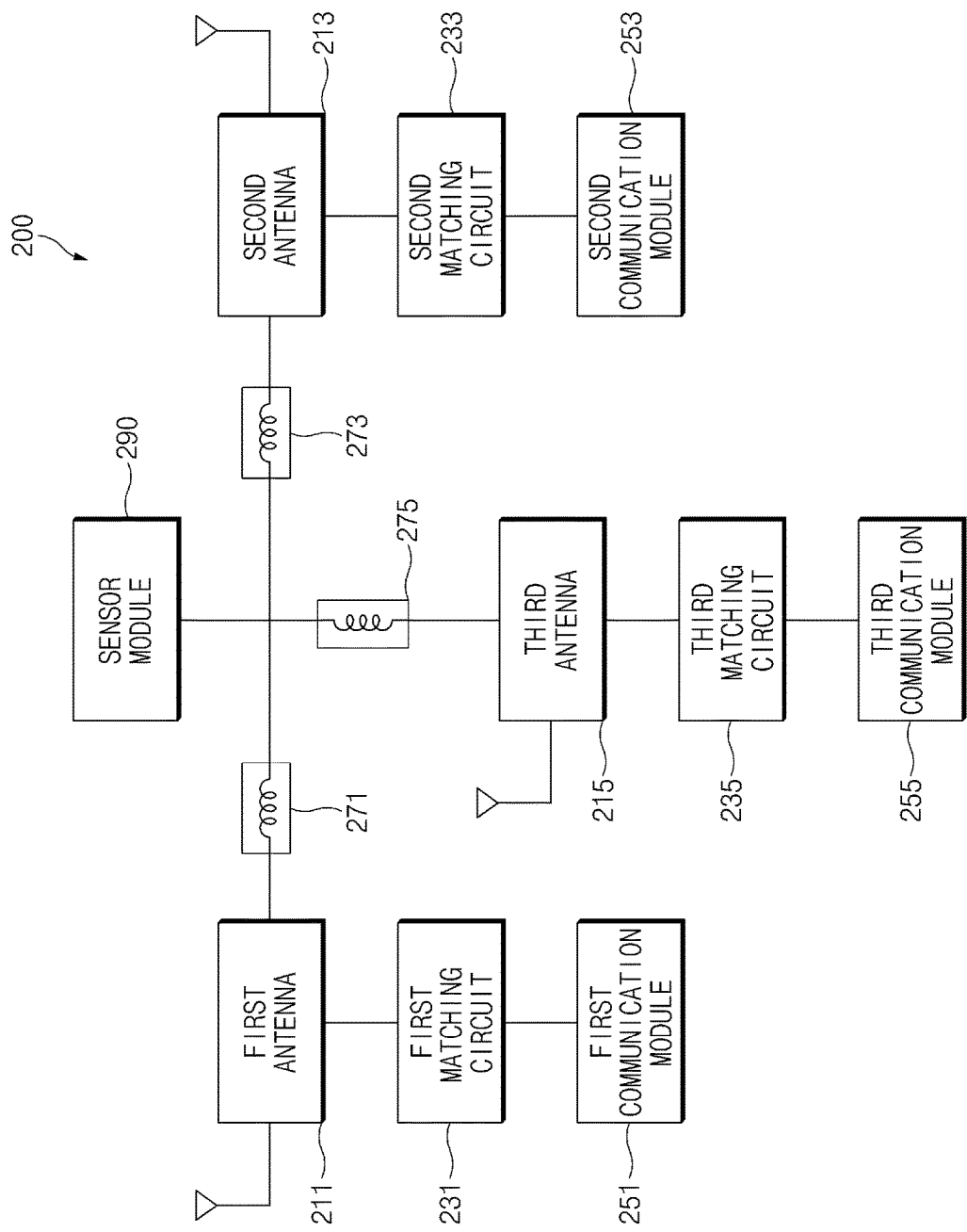
FIG. 2B is a block diagram illustrating another example configuration of a sensor module using a plurality of antennas, according to an example embodiment.

FIGS. 2A and 2B are block diagrams illustrating example configurations of a sensor module using a plurality of antennas, according to an example embodiment. FIG. 2A illustrates an example form in which two antennas are connected with a conductive line, and FIG. 2B illustrates an example form in which three antennas are connected with a conductive line. An electronic device 200 illustrated in FIGS. 2A and 2B may include a configuration that is the same as or similar to the electronic device 100 of FIG. 1.

Referring to FIGS. 2A and 2B, the electronic device 200 may include a plurality of antennas, a sensor module 290 formed using the antennas, and communication modules respectively connected to the antennas. The electronic device 200 is illustrated in FIG. 2A as including a first antenna 211 and a second antenna 213, and the electronic device 200 is illustrated in FIG. 2B as including the first antenna 211, the second antenna 213, and a third antenna 215. However, the number of antennas included in the electronic device 200 is not limited thereto. According to various embodiments, the electronic device 200 may further include at least another antenna.

Each of the antennas may include a radiator that transmits and receives a specified frequency signal and a feeding part that supplies power through a feeding line connected with the radiator. The antennas may be connected with a ground part through a ground line. As another example, at least one of the antennas may be connected with a matching circuit. The matching circuit that is an electrical circuit having impedance of a specific value may compensate for an impedance difference between two connection ends connected with the matching circuit. In FIGS. 2A and 2B, a first matching circuit 231 is illustrated as being connected between the first antenna 211 and a first communication module 251, a second matching circuit 231 is illustrated as being connected between the second antenna 213 and a second communication module 253, and a third matching circuit 235 is illustrated as being connected between the third antenna 215 and a third communication module 255.

Each of the communication modules 251, 253, and 255 that are respectively connected to the antennas 211, 213, and 215 may include a circuit for transmitting and receiving a signal of a specified frequency band. For example, each of the communication modules 251, 253, and 255 may include various communication circuitry, such as, for example, and without limitation, a transceiver, a power amplifier module (PAM), a frequency filter, a low noise amplifier (LNA), or the like. In FIGS. 2A and 2B, the first communication module 251 is illustrated as being connected to the first antenna 211, the second communication module 253 is illustrated as being connected to the second antenna 213, and the third communication module 255 is illustrated as being connected to the third antenna 215.

Each of the communication modules may include various communication circuitry, such as, for example, and without limitation, a cellular module, a Wi-Fi module, a Bluetooth (BT) module, a GNSS module (e.g., a GPS module, a Glonass module, a Beidou module, or a Galileo module), a near field communication (NFC) module, and a radio frequency (RF) module. For example, in FIG. 2A, the first communication module 251 may be the GPS module, and the second communication module 253 may be the Wi-Fi module. As another example, the first communication module 251 may be the cellular module for transmitting and receiving a signal (e.g., 900 MHz) of a GSM network, and the second communication module 253 may be the cellular module for transmitting and receiving a signal (e.g., 2.6 GHz) of a LTE network. However, kinds of the communication modules are not limited thereto. According to various embodiments, the first communication module 251, the second communication module 253, or the third communication module 255 may be a communication module for transmitting and receiving a signal belonging to a range from a TV broadcast frequency (e.g., 30 MHz) to a Wi-Fi frequency (e.g., 60 GHz). As another example, the first communication module 251 may be a communication module for transmitting and receiving a signal of a frequency band lower than the second communication module 253 and the third communication module 255. For example, the first communication module 251 may be a communication module for transmitting and receiving a signal of a low band, the second communication module 253 may be a communication module for transmitting and receiving a signal of a mid band, and the third communication module 255 may be a communication module for transmitting and receiving a signal of a high band.

The sensor module 290 may sense a contact or proximity of a part of the user's body. For example, the sensor module 290 may include a grip sensor. The sensor module 290 may be formed using at least one of the first antenna 211, the second antenna 213, and the third antenna 215. According to an embodiment, as illustrated in FIG. 2A, the sensor module 290 may be electrically connected with a point of a conductive line connecting the first antenna 211 and the second antenna 213. Accordingly, the sensor module 290 may use the first antenna 211, the second antenna 213, and the conductive line as a sensing electrode. According to another embodiment, as illustrated in FIG. 2B, the sensor module 290 may be electrically connected with a point of a conductive line connecting the first antenna 211, the second antenna 213, and the third antenna 215. Accordingly, the sensor module 290 may use the first antenna 211, the second antenna 213, the third antenna 215, and the conductive line as a sensing electrode.

At least one element, for example, an inductance element (e.g., inductor) may be disposed between the conductive line and each of antennas connected with the conductive line. In FIGS. 2A and 2B, a first inductor 271 is illustrated as being disposed between the first antenna 211 and a conductive line, a second inductor 273 is illustrated as being disposed between the second antenna 213 and the conductive line, and a third inductor 275 is illustrated as being disposed between the third antenna 215 and the conductive line. The inductance element may be connected in series between a feeding line of each antenna and a conductive line. For example, the first inductor 271 may be connected in series between a feeding line of the first antenna 211 and a conductive line, the second inductor 273 may be connected in series between a feeding line of the second antenna 211 and the conductive line, and the third inductor 275 may be connected in series between a feeding line of the third antenna 215 and the conductive line.

The at least one element, for example, inductance element may prevent and/or reduce a frequency characteristic of each antenna from being changed. For example, since the inductance element has the ability to block a high-frequency signal, the inductance element may prevent and/or reduce a high-frequency signal from any one antenna connected with a conductive line from being transmitted to another antenna. For example, the first inductor 271 may prevent and/or reduce a change in a frequency characteristic of the first antenna 211, the second inductor 273 may prevent and/or reduce a change in a frequency characteristic of the second antenna 213, and the third inductor 275 may prevent and/or reduce a change in a frequency characteristic of the third antenna 215. The first inductor 271 may prevent and/or reduce a high-frequency signal from the second antenna 213 or the third antenna 215 from being transmitted to the first antenna 211 and may prevent and/or reduce a high-frequency signal from the first antenna 211 from being output. Also, the second inductor 273 may prevent and/or reduce a high-frequency signal from the first antenna 211 or the third antenna 215 from being transmitted to the second antenna 213 and may prevent and/or reduce a high-frequency signal from the second antenna 213 from being output, and the third inductor 275 may prevent and/or reduce a high-frequency signal from the first antenna 211 or the second antenna 213 from being transmitted to the third antenna 215 and may prevent and/or reduce a high-frequency signal from the third antenna 215 from being output.

It may be advisable to dispose the inductance element at a point at which a feeding line and a conductive line are connected, for example, a point that is the most adjacent to the feeding line. For example, the first inductor 271 may be disposed to be the most adjacent to the feeding line of the first antenna 211, the second inductor 273 may be disposed to be the most adjacent to the feeding line of the second antenna 213, and the third inductor 275 may be disposed to be the most adjacent to the feeding line of the third antenna 215.

The at least one element may form, for example, a filter circuit. The filter circuit may selectively block or pass a signal of a specified frequency band. The filter circuit may be implemented with a combination of an inductor (or resistor) and a capacitor.

Figure 3:
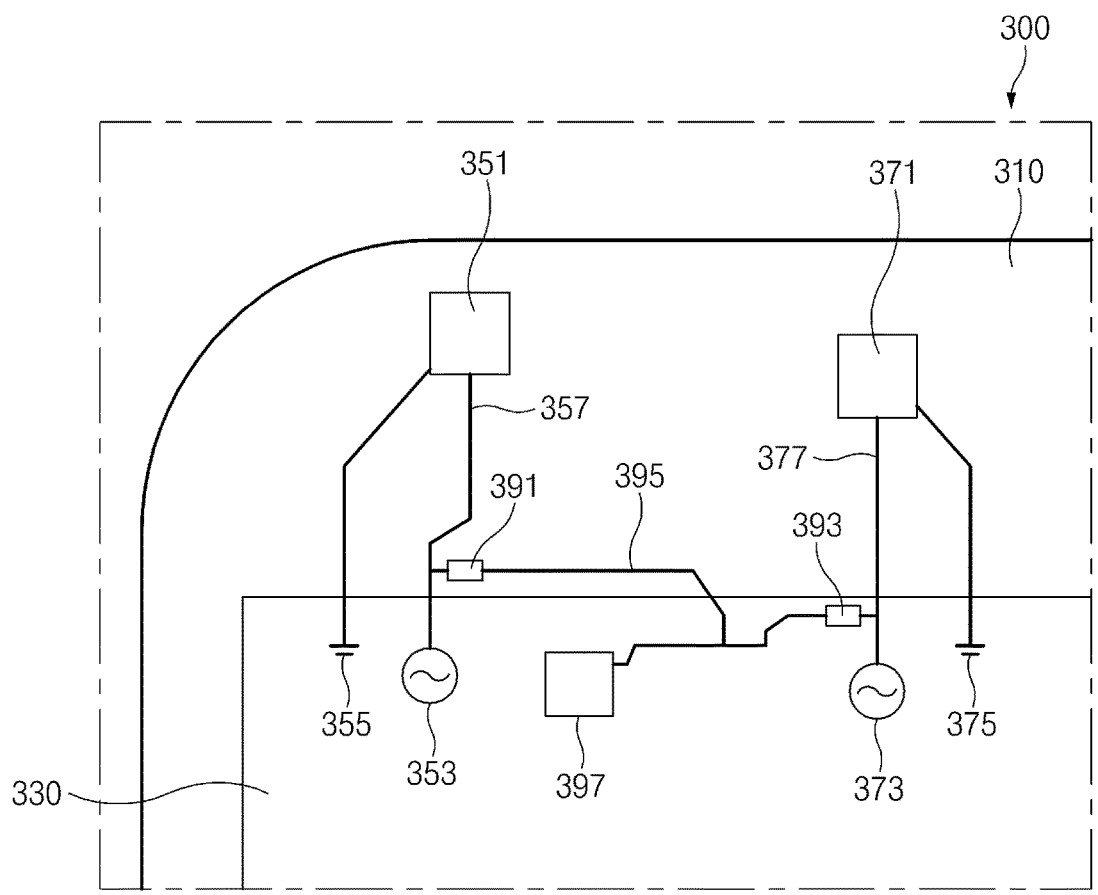
FIG. 3 is a diagram illustrating an example form in which a plurality of antennas are connected with a conductive line, according to an example embodiment.

FIG. 3 is a diagram illustrating an example form in which a plurality of antennas are connected with a conductive line, according to an example embodiment. An electronic device 300 illustrated in FIG. 3 may be part of the electronic device 100 illustrated in FIG. 1.

Referring to FIG. 3, the electronic device 300 may include a housing 310 and may include a first antenna radiator 351, a second antenna radiator 371, and a sensor module 397. The first antenna radiator 351 and the second antenna radiator 371 may transmit and receive a signal of a first frequency band and a signal of a second frequency band, respectively. The first antenna radiator 351 may be connected to a first feeding part 353 or a first ground part 355, and the second antenna radiator 371 may be connected to a second feeding part 373 or a second ground part 375.

At least one of the first feeding part 353, the first ground part 355, the second feeding part 373, and the second ground part 375 may be mounted on a printed circuit board 330. For example, at least one of the first feeding part 353 and the second feeding part 373 may include a communication module mounted on the printed circuit board 330. As another example, at least one of the first ground part 355 and the second ground part 375 may be connected to a ground area of the printed circuit board 330. As another example, at least one of the first ground part 355 and the second ground part 375 may be connected to a conductive member (or a ground member) electrically connected with the printed circuit board 330.

The first antenna radiator 351 may be connected with the first feeding part 353 through a feeding line 357, and the second antenna radiator 371 may be connected with the second feeding part 373 through a feeding line 377. The first feeding line 357 and the second feeding line 377 may be connected with a conductive line 395.

The sensor module 397 may be electrically connected with a point of the conductive line 395. The sensor module 397 may use at least one of the first antenna radiator 351, the second antenna radiator 371, the first feeding line 357, the second feeding line 377, and the conductive line 395 as a sensing electrode. For example, the sensor module 397 may sense a contact of a touch object (e.g., a part of the user's body) by using a change in capacitance that occurs when the touch object makes contact with the sensing electrode. For example, the sensor module 397 may include a grip sensor.

At least one element, for example, an inductance element may be disposed in the conductive line 395. For example, in the conductive line 395, a first inductor 391 may be disposed at a point adjacent to the first feeding line 357, and a second inductor 393 may be disposed at a point adjacent to the second feeding line 377. The first inductor 391 may perform a role of preventing a change in an electrical length for transmitting and receiving a signal of a first frequency band that is formed by the first antenna radiator 351 and the first feeding line 357. Also, the second inductor 393 may perform a role of preventing a change in an electrical length for transmitting and receiving a signal of a second frequency band that is formed by the second antenna radiator 371 and the second feeding line 377.

Figure 4A:
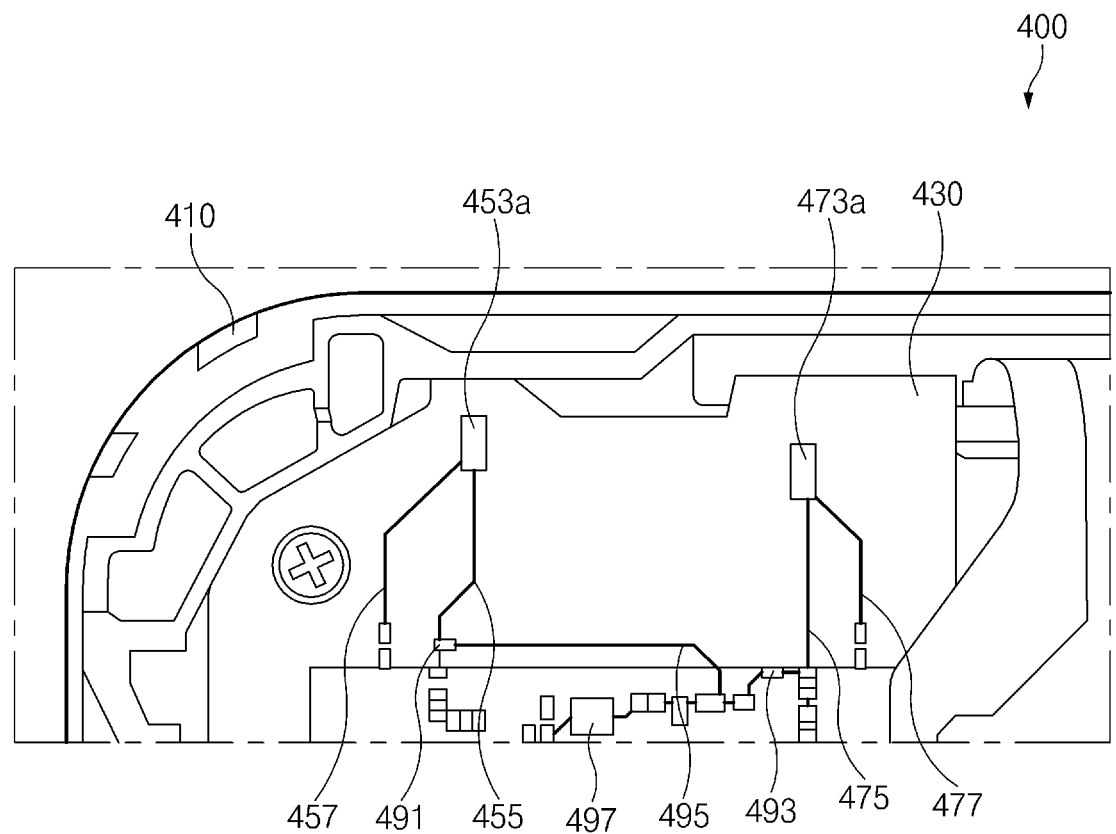
FIG. 4A is a diagram illustrating an example internal configuration of a partial front surface of an electronic device that is implemented such that a plurality of antennas are connected with a conductive line, according to an example embodiment.
Figure 4B:
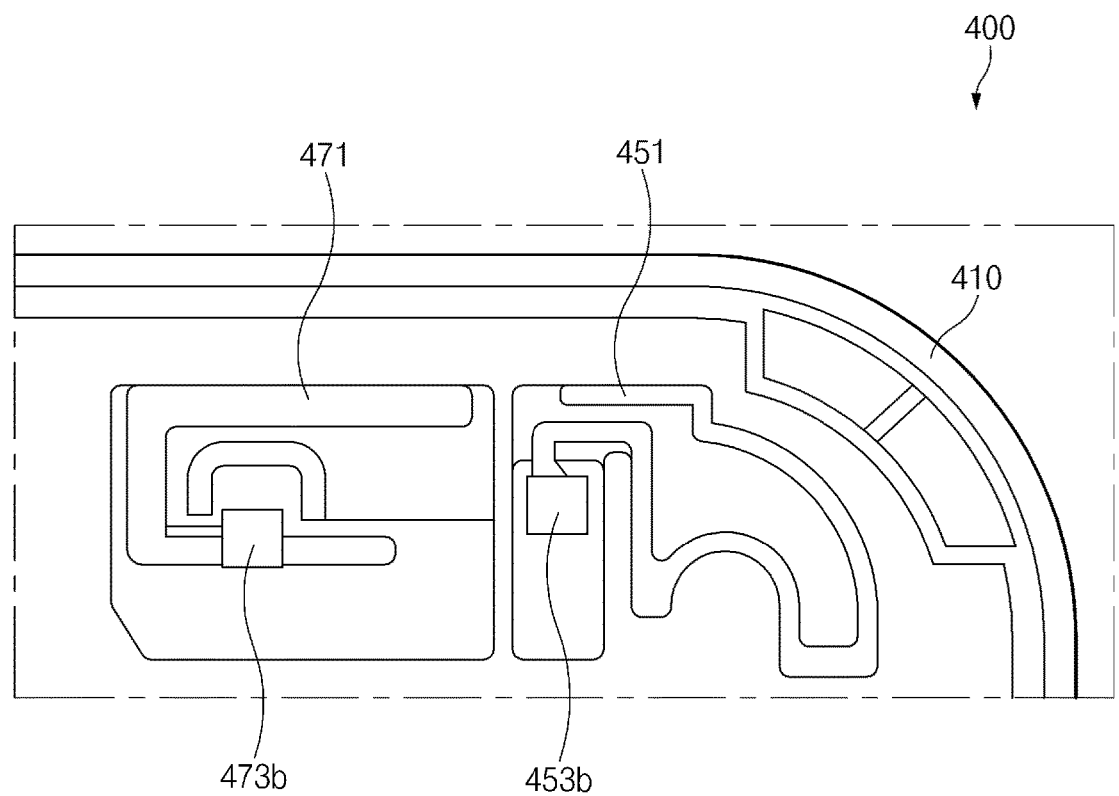
FIG. 4B is a diagram illustrating an example internal configuration of a partial rear surface of an electronic device that is implemented such that a plurality of antennas are connected with a conductive line, according to an example embodiment.
Figure 4C:
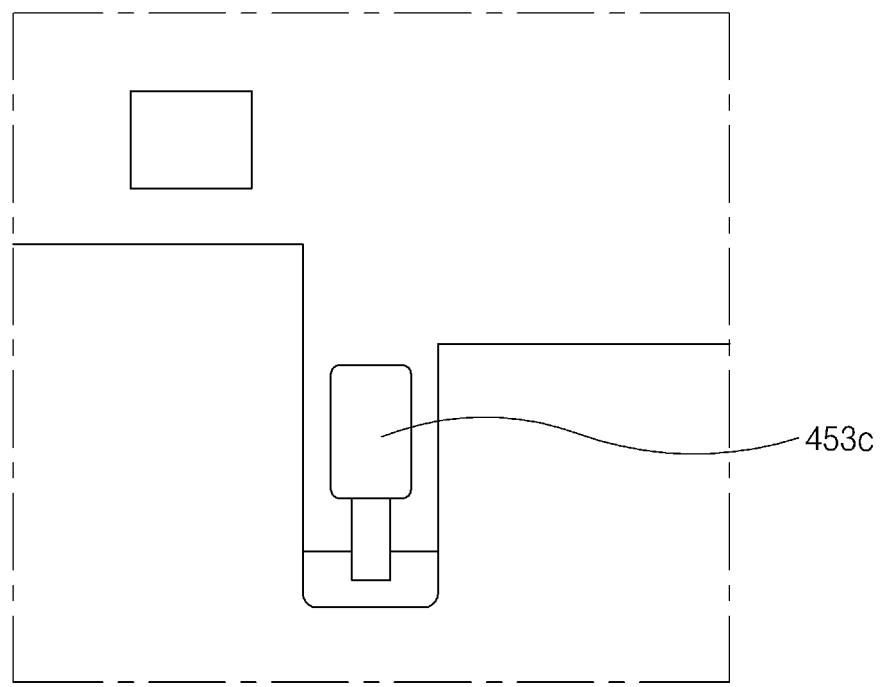
FIG. 4C is a diagram illustrating an example antenna radiator and a feeding line connected with a connector, according to an example embodiment.
Figure 4D:
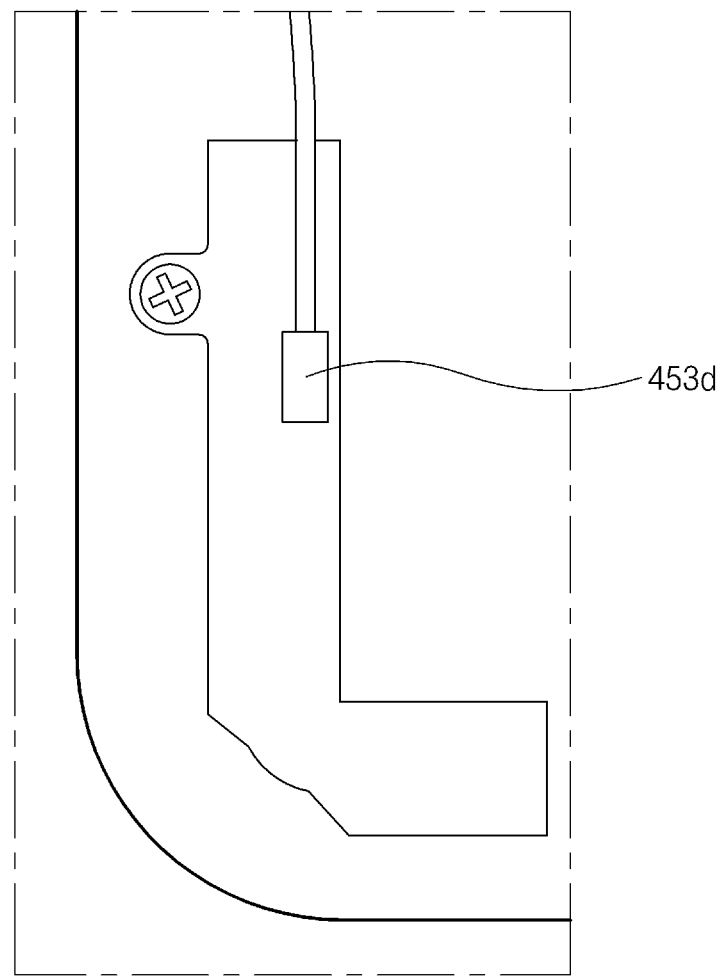
FIG. 4D is a diagram illustrating part of an example feeding line implemented with a coaxial cable, according to an example embodiment.

FIG. 4A is a diagram illustrating an example internal configuration of a partial front surface of an electronic device that is implemented such that a plurality of antennas are connected with a conductive line, according to an example embodiment, FIG. 4B is a diagram illustrating an example internal configuration of a partial rear surface of an electronic device that is implemented such that a plurality of antennas are connected with a conductive line, according to an example embodiment, FIG. 4C is a diagram illustrating an example antenna radiator and a feeding line connected with a connector, according to an example embodiment, and FIG. 4D is a diagram illustrating part of an example feeding line implemented with a coaxial cable, according to an example embodiment. An electronic device 400 illustrated in FIGS. 4A to 4D may be part of the electronic device 100 illustrated in FIG. 1.

Referring to FIGS. 4A to 4D, the electronic device 400 may include a housing 410. Various electronic parts may be disposed inside the housing 410. In FIGS. 4A to 4D, a first antenna radiator 451, a second antenna radiator 471, and a printed circuit board 430 are illustrated as being disposed inside the housing 410.

The first antenna radiator 451 and the second antenna radiator 471 may be disposed on one surface of the printed circuit board 430. However, embodiments of the present disclosure are not limited thereto. According to an embodiment, at least one of the first antenna radiator 451 and the second antenna radiator 471 may be disposed on a board different from the printed circuit board 430 and may be connected with the printed circuit board 430. In another embodiment, at least one of the first antenna radiator 451 and the second antenna radiator 471 may be disposed on at least a partial area of the housing 410. For example, the housing 410 may include a conductive member (e.g., a metal frame) in at least a partial area thereof, and at least one of the first antenna radiator 451 and the second antenna radiator 471 may include at least part of the conductive member.

At least one of the first antenna radiator 451 and the second antenna radiator 471 may be disposed on one surface of the printed circuit board 430, and at least one of a first feeding part and a first ground part, which are connected with the first antenna radiator 451, and a second feeding part and a second ground part, which are connected with the second antenna radiator 471, may be disposed on an opposite surface of the printed circuit board 430. In FIGS. 4A to 4D, the first antenna radiator 451 and the second antenna radiator 471 are illustrated as being disposed on a rear surface of the printed circuit board 430 and being connected with a front surface of the printed circuit board 430 through a first connection part 453a and a second connection part 473a. For example, the first antenna radiator 451 may be connected with a third connection part 453b, and the third connection part 453b may be connected with the first connection part 453a disposed on the front surface of the printed circuit board 430. As another example, the second antenna radiator 471 may be connected with a fourth connection part 473b, and the fourth connection part 473b may be connected with the second connection part 473a disposed on the front surface of the printed circuit board 430. Although not illustrated in FIG. 4A, a first feeding part, a first ground part, a second feeding part, and a second ground part may be disposed on the front surface of the printed circuit board 430. However, embodiments of the present disclosure are not limited thereto. According to an embodiment, the first antenna radiator 451 and the second antenna radiator 471 may be disposed on the front surface of the printed circuit board 430, and the first feeding part, the first ground part, the second feeding part, and the second ground part may be disposed on the rear surface of the printed circuit board 430. Alternatively, the first antenna radiator 451, the second antenna radiator 471, the first feeding part, the first ground part, the second feeding part, and the second ground part may be disposed on the same surface of the printed circuit board 430.

The first antenna radiator 451 may be connected with the first feeding part through a first feeding line 455 connected with the first connection part 453a and may be connected with the first ground part through a first ground line 457. The second antenna radiator 471 may be connected with the second feeding part through a second feeding line 475 connected with the second connection part 473a and may be connected with the second ground part through a second ground line 477. The first feeding part and the second feeding part may respectively include a first communication module and a second communication module, and at least one of the first ground part and the second ground part may be connected with a ground area of the printed circuit board 430.

The first feeding line 455 and the second feeding line 475 may be connected to each other by a conductive line 495. For example, the conductive line 495 may connect a point of the first feeding line 455 and a point of the second feeding line 475.

At least one element, for example, an inductance element may be disposed in the conductive line 495. For example, at least one of a first inductor 491 and a second inductor 493 may be disposed in the conductive line 495. The first inductor 491 may be disposed to be adjacent to the first feeding line 455, and the second inductor 493 may be disposed to be adjacent to the second feeding line 457.

A sensor module 497 may be mounted on the printed circuit board 430. The sensor module 497 may include a grip sensor. The sensor module 497 may be electrically connected with a point of the conductive line 495. For example, the sensor module 495 may be connected to a point between the first inductor 491 and the second inductor 493. The sensor module 497 may sense a contact or proximity of a touch object. For example, the sensor module 497 may use at least one of the first antenna radiator 451, the second antenna radiator 471, the first feeding line 455, the second feeding line 475, and the conductive line 495 as a sensing electrode.

According to various embodiments, each of the first connection part 453a, the second connection part 473a, the third connection part 453b, and the fourth connection part 473b may include a connection terminal, a contact pad, a connector, or the like. For example, as illustrated in FIGS. 4A and 4B, at least one of the first connection part 453a, the second connection part 473a, the third connection part 453b, and the fourth connection part 473b may include a contact pad. As another example, as illustrated in FIG. 4C, at least one of the first connection part 453a, the second connection part 473a, the third connection part 453b, and the fourth connection part 473b may include a connector 453c.

According to various embodiments, at least one of the first feeding line 455 and the second feeding line 475 may include a cable (e.g., a coaxial cable). For example, as illustrated in FIG. 4D, at least one of the first feeding line 455 and the second feeding line 475 may include a coaxial cable, and at least one of the first connection part 453a, the second connection part 473a, the third connection part 453b, and the fourth connection part 473b may include a connector 453d formed at one end of the coaxial cable.

Figure 5A:
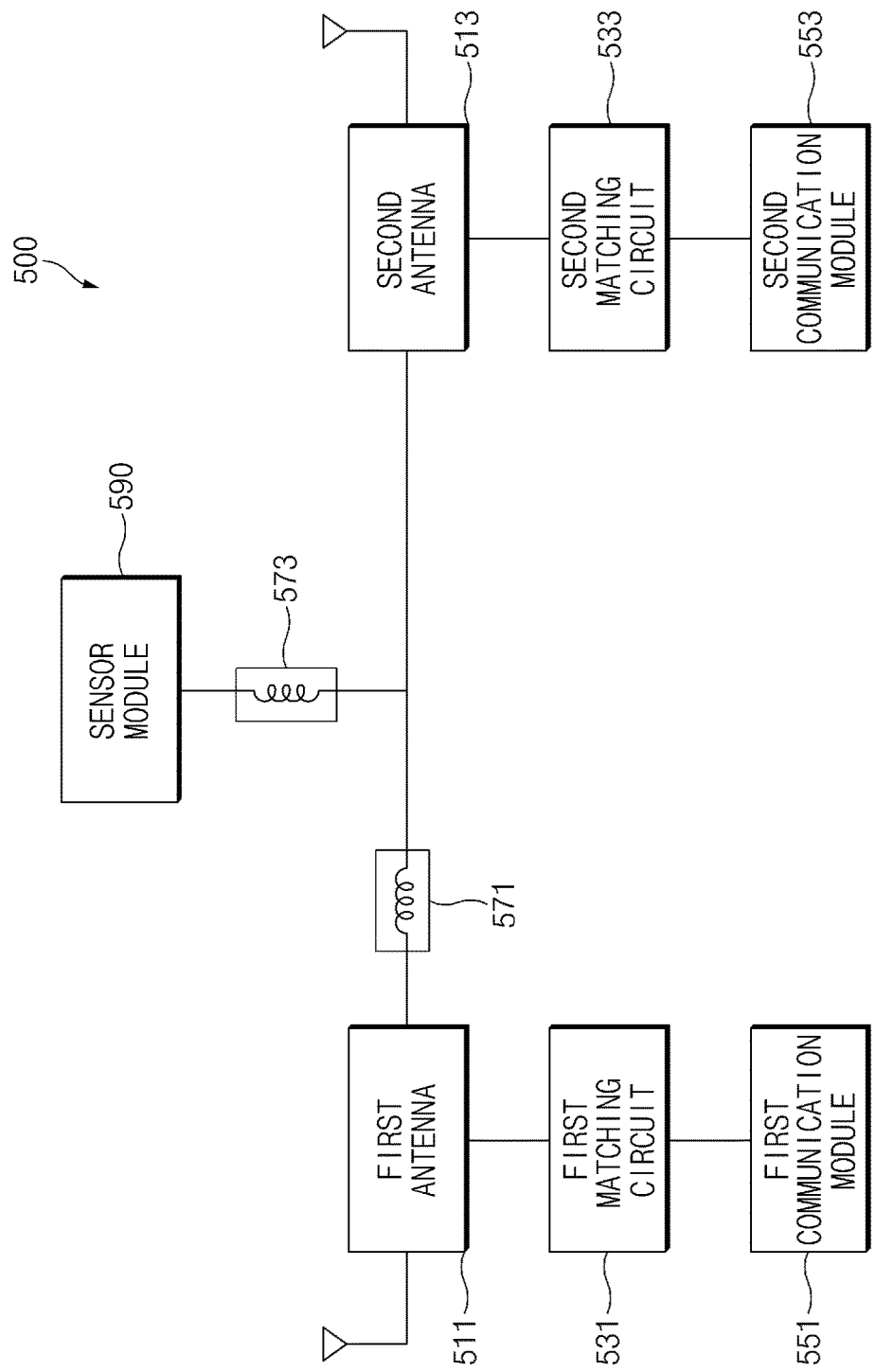
FIG. 5A is a block diagram illustrating example locations at which elements are disposed, according to an example embodiment.
Figure 5B:
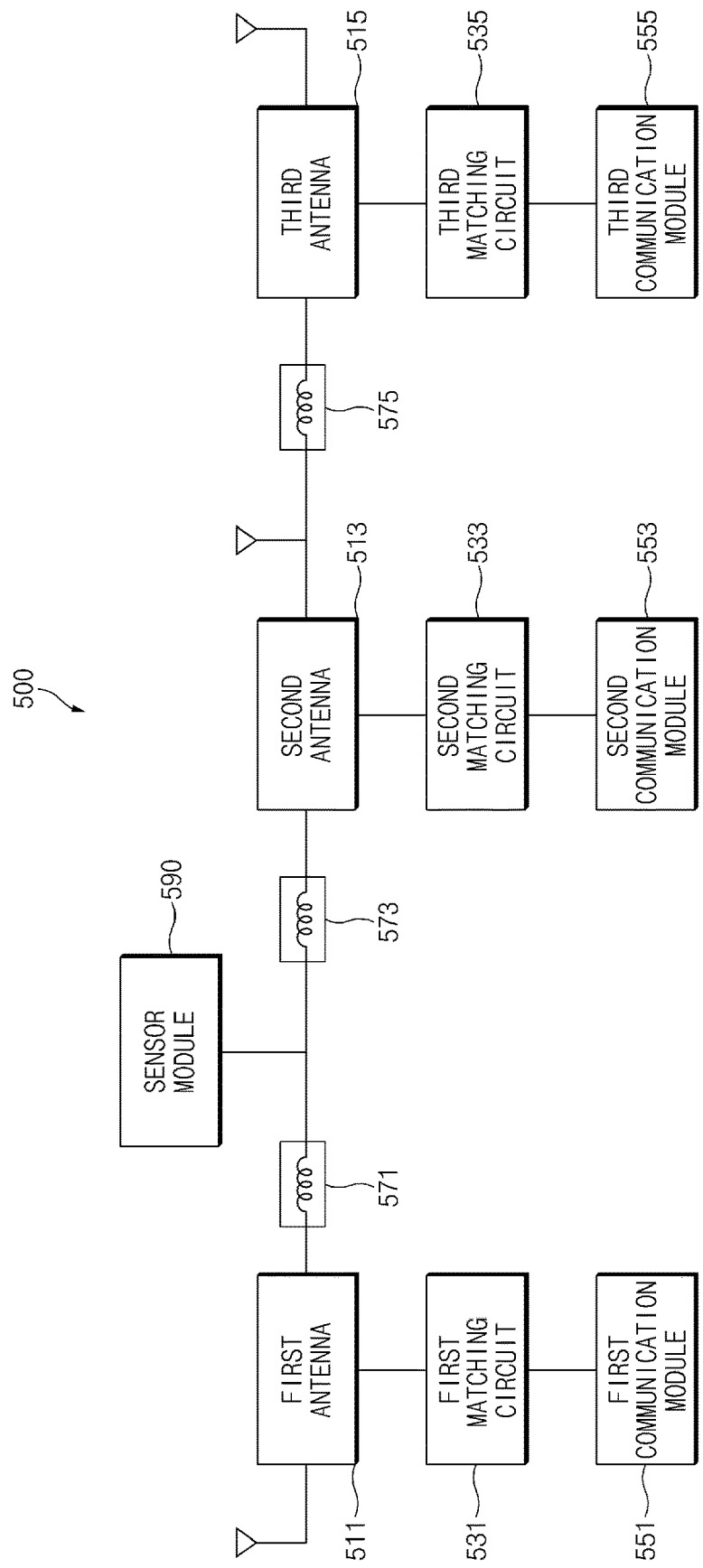
FIG. 5B is a block diagram illustrating an example location at which a sensor module is connected, according to an example embodiment.
Figure 5C:
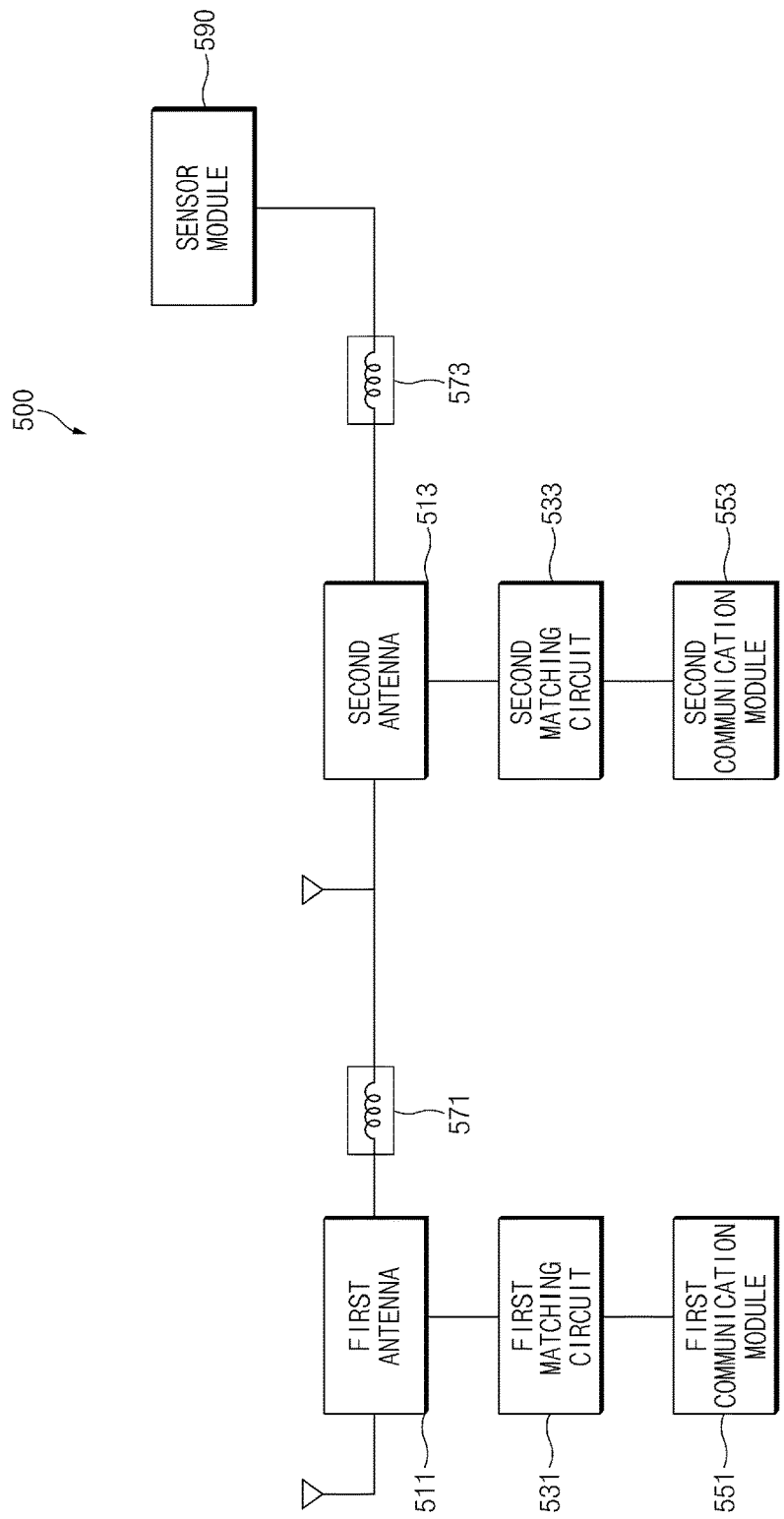
FIG. 5C is a block diagram illustrating another example location at which a sensor module is connected, according to an example embodiment.
Figure 5D:
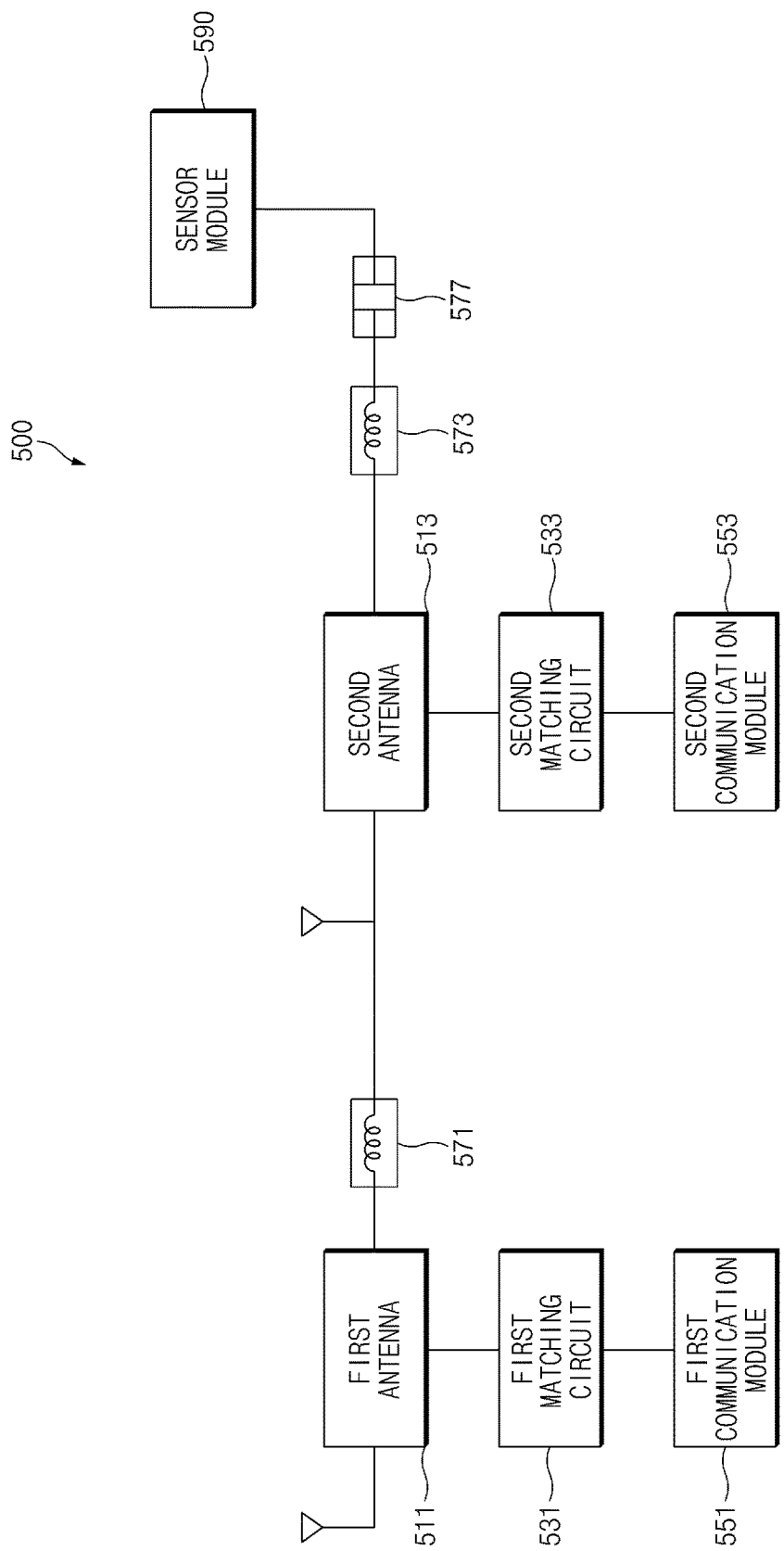
FIG. 5D is a block diagram illustrating an example form in which elements are disposed, according to an example embodiment.
Figure 5E:
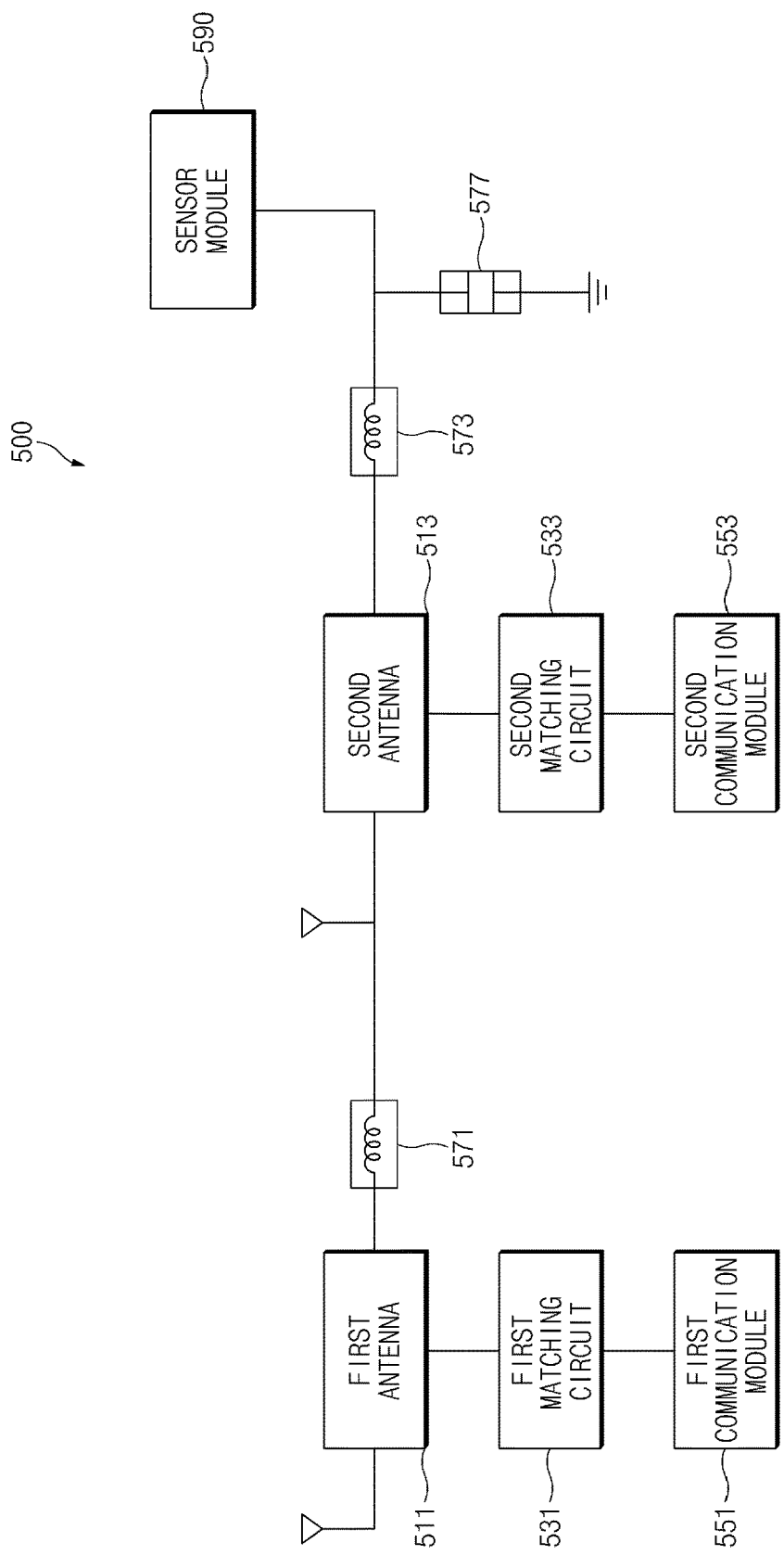
FIG. 5E is a block diagram illustrating another example form in which elements are disposed, according to an example embodiment.

FIG. 5A is a diagram illustrating example locations at which elements are disposed, according to an example embodiment, FIG. 5B is a diagram illustrating an example location at which a sensor module is connected, according to an example embodiment, FIG. 5C is a diagram illustrating another example location at which a sensor module is connected, according to an example embodiment, FIG. 5D is a diagram illustrating an example form in which elements are disposed, according to an example embodiment, and FIG. 5E is a diagram illustrating another example form in which elements are disposed, according to an example embodiment.

An electronic device 500 illustrated in FIGS. 5A to 5E may include a configuration that is the same as or similar to the electronic device 200 of FIGS. 2A and 2B. An element-disposed location, an element-disposed form, and a sensor module-connected location will be described with reference to FIGS. 5A to 5E.

According to various embodiments, the electronic device 500 may include a first antenna 511 and a second antenna 513, and the first antenna 511 and the second antenna 513 may be connected with a conductive line. However, the number of antennas is not limited thereto. According to an embodiment, as illustrated in FIG. 5B, the electronic device 500 may further include a third antenna 515, and the third antenna 515 may be also connected with the conductive line.

Each of the antennas 511, 513, and 515 included in the electronic device 500 may be connected to a communication module that includes a circuit for transmitting and receiving a signal of a frequency band corresponding to each antenna. For example, the first antenna 511 may be connected with a first communication module 551, the second antenna 513 may be connected with a second communication module 553, and the third antenna 515 may be connected with a third communication module 555. Also, a matching circuit may be disposed between each antenna and a communication module with. For example, a first matching circuit 531 may be disposed between the first antenna 511 and the first communication module 551, a second matching circuit 533 may be disposed between the second antenna 513 and the second communication module 553, and a third matching circuit 535 may be disposed between the third antenna 515 and the third communication module 555.

A sensor module 590 may be connected with a point of the conductive line. For example, as illustrated in FIGS. 5A and 5B, the sensor module 590 may be connected to a point of a conductive line connecting the first antenna 511 and the second antenna 513. However, a connection location of the sensor module 590 is not limited thereto. According to various embodiments, the sensor module 590 may not be connected to the point of the conductive line, but it may be connected to the first antenna 511, the second antenna 513, or the third antenna 515. For example, as illustrated in FIGS. 5C to 5E, the sensor module 590 may be connected to the second antenna 513.

At least one element may be disposed in the conductive line. For example, as illustrated in FIG. 5B, a first inductor 571 may be disposed at a point, which is connected with the first antenna 511, of the conductive line, a second inductor 573 may be disposed at a point, which is connected with the second antenna 513, of the conductive line and a third inductor 575 may be disposed at a point which is connected with the third antenna 515. However, a location at which the at least one element is disposed and the number of elements are not limited thereto. According to an embodiment, as illustrated in FIG. 5A, the second inductor 573 may be disposed at a point, which is connected with the sensor module 590, of the conductive line. Alternatively, as illustrated in FIGS. 5C to 5E, the first inductor 571 may be disposed in the conductive line, and the second inductor 573 may be disposed between the second antenna 513 and the sensor module 590. In another embodiment, the first inductor 571 and the second inductor 573 may be disposed in the conductive line, and another element (e.g., a third inductor (not illustrated)) may be disposed between the sensor module 590 and the first antenna 511, the second antenna 513, or the third antenna 515.

According to various embodiments, elements may be disposed between an antenna and the sensor module 590 in various shapes. For example, as illustrated in FIG. 5D, the second inductor 573 and a capacitor 577 may be disposed to be connected in series between the sensor module 590 and the second antenna 513. As another example, as illustrated in FIG. 5E, the second inductor 573 and the capacitor 577 may be disposed to be connected in parallel between the sensor module 590 and the second antenna 513. As at least one element is disposed between an antenna and the sensor module 590, a high-frequency signal may be prevented from being transmitted from the antenna to the sensor module 590. Accordingly, it may be possible to protect the sensor module 590 and to reduce noise. This may mean that the performance of the sensor module 590 is secured.

As described above, according to various example embodiments, an electronic device may include a first antenna element, a first feeding line electrically connected with the first antenna element, a second antenna element, a second feeding line electrically connected with the second antenna element, a conductive line connecting a point of the first antenna element or the first feeding line and a point of the second antenna element or the second feeding line, and a sensor module electrically connected with a point of at least one of the first antenna element, the second antenna element, the first feeding line, the second feeding line, and the conductive line.

According to various example embodiments, the sensor module may be configured to determine whether a contact or proximity of a part of a human body is made, based on a change in at least one electrical characteristic of a plurality of electrical characteristics including capacitance associated with the first antenna element, the second antenna element, and the conductive line.

According to various example embodiments, the sensor module may include a grip sensor.

According to various example embodiments, the first antenna element and the first feeding line may form an electrical length for transmitting and receiving a signal of a first frequency band. And the second antenna element and the second feeding line may form an electrical length for transmitting and receiving a signal of a second frequency band.

According to various example embodiments, the first frequency band may include at least one frequency band for transmitting and receiving a Wi-Fi signal. And the second frequency band may include at least one frequency band for transmitting and receiving a GPS signal.

According to various example embodiments, the first frequency band may include a frequency band lower than the second frequency band.

According to various example embodiments, at least one element may be disposed in the conductive line.

According to various example embodiments, the at least one element may include an inductance element having a value that allows a signal of a frequency, which is higher than a specified frequency, to be blocked.

According to various example embodiments, a first inductance element may be disposed at a point at which the conductive line and the first feeding line are connected. And a second inductance element may be disposed at a point at which the conductive line and the second feeding line are connected.

According to various example embodiments, the first inductance element and the second inductance element may have the same value.

According to various example embodiments, the first feeding line may be connected with a first communication module for transmitting and receiving a signal of a first frequency band. And the second feeding line may be connected with a second communication module for transmitting and receiving a signal of a second frequency band.

According to various example embodiments, the first communication module may be connected with a first matching circuit. And the second communication module may be connected with a second matching circuit.

According to various example embodiments, the first feeding line and the second feeding line may be disposed on a printed circuit board. And at least one of the first antenna element and the second antenna element may be electrically connected with a ground line connected with a ground area of the printed circuit board.

As described above, according to various example embodiments, an electronic device may include a housing including a first surface facing a first direction, a second surface facing a second direction opposite the first direction, and a side surface at least partially surrounding at least a part of a space formed between the first surface and the second surface, a first antenna element, a second antenna element, a first feeding line electrically connected with the first antenna element, a second feeding line electrically connected with the second antenna element, a first communication module connected with the first feeding line and configured to transmit and receive a signal of a first frequency band, a second communication module connected with the second feeding line and configured to transmit and receive a signal of a second frequency band, a conductive line connecting a point of the first feeding line and a point of the second feeding line, a printed circuit board seated inside the housing, a sensor module disposed on the printed circuit board and electrically connected with a point of the conductive line, and a processor disposed on the printed circuit board and operatively connected with the sensor module.

According to various example embodiments, the sensor module may determine whether a contact or proximity of a part of a human body is made, based on a change in capacitance associated with the first antenna element, the second antenna element, and the conductive line. And the processor may reduce power being supplied to the first antenna element and the second antenna element based on the result of determining whether the contact or proximity of the part of the human body is made.

According to various example embodiments, the housing may include a conductive member in at least a partial area. And at least one of the first antenna element and the second antenna element may include at least part of the conductive member.

According to various example embodiments, at least one element may be disposed in the conductive line.

According to various example embodiments, a first inductance element may be disposed at a point, which is connected with the first feeding line, of the conductive line. And a second inductance element may be disposed at a point, which is connected with the second feeding line, of the conductive line.

According to various example embodiments, the first communication module may be connected with a first matching circuit. And the second communication module may be connected with a second matching circuit.

According to various example embodiments, at least one of the first antenna element and the second antenna element may be electrically connected with a ground line connected with a ground area of the printed circuit board.

Figure 6:
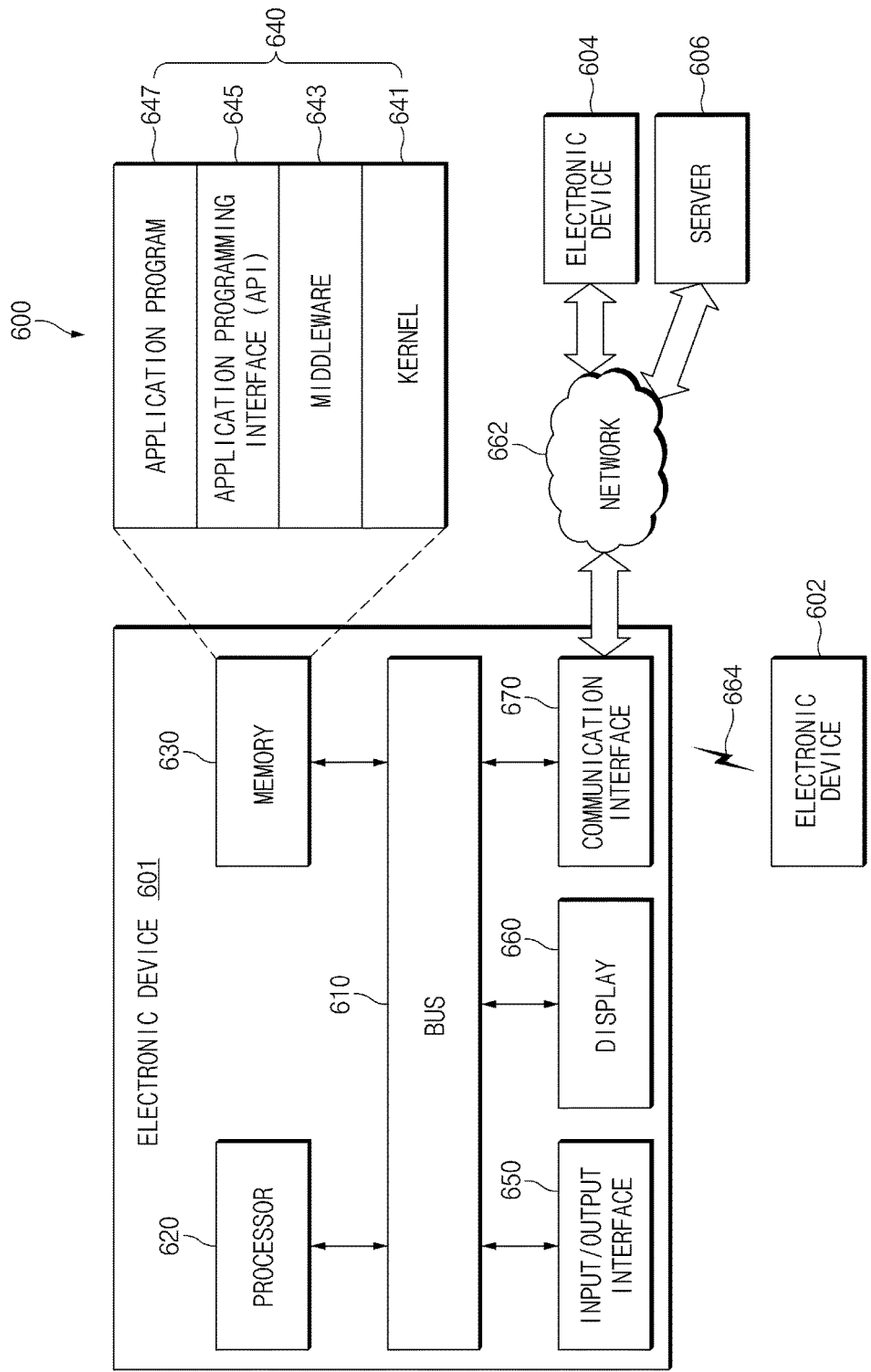
FIG. 6 is a diagram illustrating an example electronic device in a network environment according to an example embodiment of the present disclosure.

FIG. 6 is a diagram illustrating an example electronic device in a network environment according to an example embodiment of the present disclosure. The electronic device 601 of FIG. 6 may have a configuration that is the same as or similar to that of the electronic device 100 of FIG. 1.

An electronic device 601 in a network environment 600 according to various embodiments of the present disclosure will be described with reference to FIG. 6. The electronic device 601 may include a bus 610, a processor (e.g., including processing circuitry) 620, a memory 630, an input/output interface (e.g., including input/output circuitry) 650, a display 660, and a communication interface (e.g., including communication circuitry) 670. In various embodiments of the present disclosure, at least one of the foregoing elements may be omitted or another element may be added to the electronic device 601.

The bus 610 may include a circuit for connecting the above-mentioned elements 610 to 670 to each other and transferring communications (e.g., control messages and/or data) among the above-mentioned elements.

The processor 620 may include various processing circuitry, such as, for example, and without limitation at least one of a dedicated processor, a central processing unit (CPU), an application processor (AP), or a communication processor (CP). The processor 620 may perform data processing or an operation related to communication and/or control of at least one of the other elements of the electronic device 601.

The memory 630 may include a volatile memory and/or a nonvolatile memory. The memory 630 may store instructions or data related to at least one of the other elements of the electronic device 601. According to an embodiment of the present disclosure, the memory 630 may store software and/or a program 640. The program 640 may include, for example, a kernel 641, a middleware 643, an application programming interface (API) 645, and/or an application program (or an application) 647. At least a portion of the kernel 641, the middleware 643, or the API 645 may be referred to as an operating system (OS).

The kernel 641 may control or manage system resources (e.g., the bus 610, the processor 620, the memory 630, or the like) used to perform operations or functions of other programs (e.g., the middleware 643, the API 645, or the application program 647). Furthermore, the kernel 641 may provide an interface for allowing the middleware 643, the API 645, or the application program 647 to access individual elements of the electronic device 601 in order to control or manage the system resources.

The middleware 643 may serve as an intermediary so that the API 645 or the application program 647 communicates and exchanges data with the kernel 641.

Furthermore, the middleware 643 may handle one or more task requests received from the application program 647 according to a priority order. For example, the middleware 643 may assign at least one application program 647 a priority for using the system resources (e.g., the bus 610, the processor 620, the memory 630, or the like) of the electronic device 601. For example, the middleware 643 may handle the one or more task requests according to the priority assigned to the at least one application, thereby performing scheduling or load balancing with respect to the one or more task requests.

The API 645, which is an interface for allowing the application 647 to control a function provided by the kernel 641 or the middleware 643, may include, for example, at least one interface or function (e.g., instructions) for file control, window control, image processing, character control, or the like.

The input/output interface 650 may include various input/output circuitry that serve to transfer an instruction or data input from a user or another external device to (an)other element(s) of the electronic device 601. Furthermore, the input/output interface 650 may output instructions or data received from (an)other element(s) of the electronic device 601 to the user or another external device.

The display 660 may include, for example, a liquid crystal display (LCD), a light-emitting diode (LED) display, an organic light-emitting diode (OLED) display, a microelectromechanical systems (MEMS) display, or an electronic paper display, or the like, but is not limited thereto. The display 660 may present various content (e.g., a text, an image, a video, an icon, a symbol, or the like) to the user. The display 660 may include a touch screen, and may receive a touch, gesture, proximity or hovering input from an electronic pen or a part of a body of the user.

The communication interface 670 may include various communication circuitry and set communications between the electronic device 601 and an external device (e.g., a first external electronic device 602, a second external electronic device 604, or a server 606). For example, the communication interface 670 may be connected to a network 662 via wireless communications or wired communications so as to communicate with the external device (e.g., the second external electronic device 604 or the server 606).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 664. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 601 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 662 may include at least one of telecommunications networks, for example, a computer network (e.g., local area network (LAN) or wide area network (WAN)), the Internet, or a telephone network.

The types of the first external electronic device 602 and the second external electronic device 604 may be the same as or different from the type of the electronic device 601. According to an embodiment of the present disclosure, the server 606 may include a group of one or more servers. A portion or all of operations performed in the electronic device 601 may be performed in one or more other electronic devices (e.g., the first electronic device 602, the second external electronic device 604, or the server 606). When the electronic device 601 should perform a certain function or service automatically or in response to a request, the electronic device 601 may request at least a portion of functions related to the function or service from another device (e.g., the first electronic device 602, the second external electronic device 604, or the server 606) instead of or in addition to performing the function or service for itself. The other electronic device (e.g., the first electronic device 602, the second external electronic device 604, or the server 606) may perform the requested function or additional function, and may transfer a result of the performance to the electronic device 601. The electronic device 601 may use a received result itself or additionally process the received result to provide the requested function or service. To this end, for example, a cloud computing technology, a distributed computing technology, or a client-server computing technology may be used.

Figure 7:
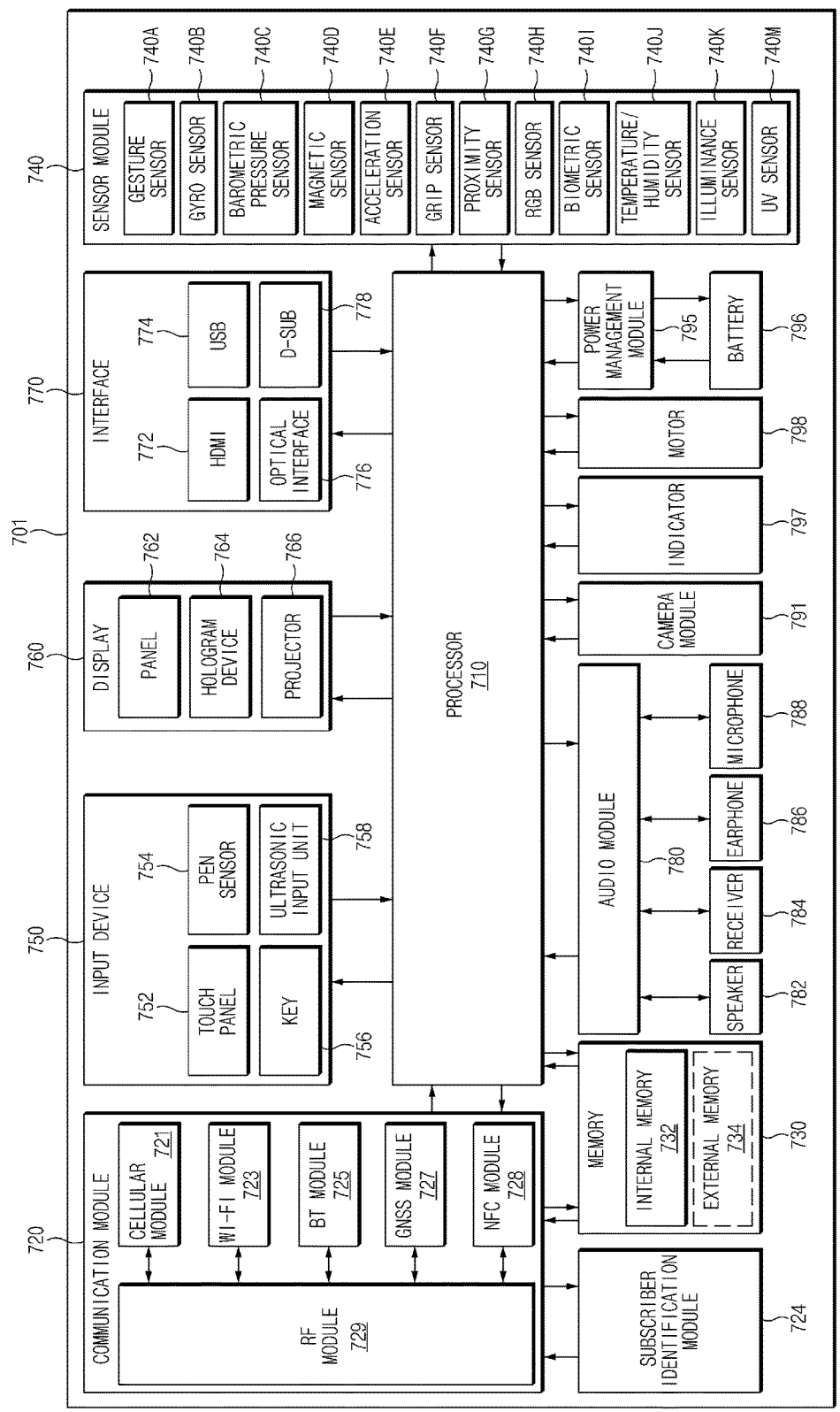
FIG. 7 is a block diagram illustrating an example electronic device according to an example embodiment of the present disclosure.

FIG. 7 is a block diagram illustrating an example electronic device according to an example embodiment of the present disclosure.

Referring to FIG. 7, an electronic device 701 may include, for example, a part or the entirety of the electronic device 601 illustrated in FIG. 6. The electronic device 701 may include at least one processor (e.g., AP) (e.g., including processing circuitry) 710, a communication module (e.g., including communication circuitry) 720, a subscriber identification module (SIM) 724, a memory 730, a sensor module 740, an input device (e.g., including input circuitry) 750, a display 760, an interface (e.g., including interface circuitry) 770, an audio module 780, a camera module 791, a power management module 795, a battery 796, an indicator 797, and a motor 798.

The processor 710 may include various processing circuitry and run an operating system or an application program so as to control a plurality of hardware or software elements connected to the processor 710, and may process various data and perform operations. The processor 710 may be implemented as, for example, a system on chip (SoC). According to an embodiment of the present disclosure, the processor 710 may further include a graphic processing unit (GPU) and/or an image signal processor. The processor 710 may include at least a portion (e.g., a cellular module 721) of the elements illustrated in FIG. 7. The processor 710 may load, on a volatile memory, an instruction or data received from at least one of other elements (e.g., a nonvolatile memory) to process the instruction or data, and may store various data in a nonvolatile memory.

The communication module 720 may have a configuration that is the same as or similar to that of the communication interface 670 of FIG. 6. The communication module 720 may include various communication circuitry, such as, for example, and without limitation, a cellular module 721, a Wi-Fi module 723, a Bluetooth (BT) module 725, a GNSS module 727 (e.g., a GPS module, a GLONASS module, a BeiDou module, or a Galileo module), a NFC module 728, and a radio frequency (RF) module 729.

The cellular module 721 may provide, for example, a voice call service, a video call service, a text message service, or an Internet service through a communication network. The cellular module 721 may identify and authenticate the electronic device 701 in the communication network using the subscriber identification module 724 (e.g., a SIM card). The cellular module 721 may perform at least a part of functions that may be provided by the processor 710. The cellular module 721 may include a communication processor (CP).

Each of the Wi-Fi module 723, the Bluetooth module 725, the GNSS module 727 and the NFC module 728 may include, for example, a processor for processing data transmitted/received through the modules. According to some various embodiments of the present disclosure, at least a part (e.g., two or more) of the cellular module 721, the Wi-Fi module 723, the Bluetooth module 725, the GNSS module 727, and the NFC module 728 may be included in a single integrated chip (IC) or IC package.

The RF module 729 may transmit/receive, for example, communication signals (e.g., RF signals). The RF module 729 may include, for example, a transceiver, a power amp module (PAM), a frequency filter, a low noise amplifier (LNA), an antenna, or the like. According to another embodiment of the present disclosure, at least one of the cellular module 721, the Wi-Fi module 723, the Bluetooth module 725, the GNSS module 727, or the NFC module 728 may transmit/receive RF signals through a separate RF module.

The SIM 724 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 730 (e.g., the memory 630) may include, for example, an internal memory 732 and/or an external memory 734. The internal memory 732 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 734 may include a flash drive such as a compact flash (CF), a secure digital (SD), a Micro-SD, a Mini-SD, an extreme digital (xD), a MultiMediaCard (MMC), a memory stick, or the like. The external memory 734 may be operatively and/or physically connected to the electronic device 701 through various interfaces.

The sensor module 740 may, for example, measure physical quantity or detect an operation state of the electronic device 701 so as to convert measured or detected information into an electrical signal. The sensor module 740 may include, for example, at least one of a gesture sensor 740A, a gyro sensor 740B, a barometric pressure sensor 740C, a magnetic sensor 740D, an acceleration sensor 740E, a grip sensor 740F, a proximity sensor 740G, a color sensor 740H (e.g., a red/green/blue (RGB) sensor), a biometric sensor 740I, a temperature/humidity sensor 740J, an illuminance sensor 740K, or an ultraviolet (UV) sensor 740M. Additionally or alternatively, the sensor module 740 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 740 may further include a control circuit for controlling at least one sensor included therein. In some various embodiments of the present disclosure, the electronic device 701 may further include a processor configured to control the sensor module 740 as a part of the processor 710 or separately, so that the sensor module 740 is controlled while the processor 710 is in a sleep state.

The input device 750 may include various input circuitry, such as, for example, and without limitation, a touch panel 752, a (digital) pen sensor 754, a key 756, or an ultrasonic input device 758. The touch panel 752 may employ at least one of capacitive, resistive, infrared, and ultraviolet sensing methods. The touch panel 752 may further include a control circuit. The touch panel 752 may further include a tactile layer so as to provide a haptic feedback to a user.

The (digital) pen sensor 754 may include, for example, a sheet for recognition which is a part of a touch panel or is separate. The key 756 may include, for example, a physical button, an optical button, or a keypad. The ultrasonic input device 758 may sense ultrasonic waves generated by an input tool through a microphone 788 so as to identify data corresponding to the ultrasonic waves sensed.

The display 760 (e.g., the display 660) may include a panel 762, a hologram device 764, or a projector 766. The panel 762 may have a configuration that is the same as or similar to that of the display 660 of FIG. 6. The panel 762 may be, for example, flexible, transparent, or wearable. The panel 762 and the touch panel 752 may be integrated into a single module. The hologram device 764 may display a stereoscopic image in a space using a light interference phenomenon. The projector 766 may project light onto a screen so as to display an image. The screen may be disposed in the inside or the outside of the electronic device 701. According to an embodiment of the present disclosure, the display 760 may further include a control circuit for controlling the panel 762, the hologram device 764, or the projector 766.

The interface 770 may include various interface circuitry, such as, for example, and without limitation, an HDMI 772, a USB 774, an optical interface 776, or a D-subminiature (D-sub) 778. The interface 770, for example, may be included in the communication interface 670 illustrated in FIG. 6. Additionally or alternatively, the interface 770 may include, for example, a mobile high-definition link (MI-IL) interface, an SD card/multi-media card (MMC) interface, or an infrared data association (IrDA) interface.

The audio module 780 may convert, for example, a sound into an electrical signal or vice versa. At least a portion of elements of the audio module 780 may be included in the input/output interface 650 illustrated in FIG. 6. The audio module 780 may process sound information input or output through a speaker 782, a receiver 784, an earphone 786, or the microphone 788.

The camera module 791 is, for example, a device for shooting a still image or a video. According to an embodiment of the present disclosure, the camera module 791 may include at least one image sensor (e.g., a front sensor or a rear sensor), a lens, an image signal processor (ISP), or a flash (e.g., an LED or a xenon lamp).

The power management module 795 may manage power of the electronic device 701. According to an embodiment of the present disclosure, the power management module 795 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 796 and a voltage, current or temperature thereof while the battery is charged. The battery 796 may include, for example, a rechargeable battery and/or a solar battery.

The indicator 797 may display a specific state of the electronic device 701 or a part thereof (e.g., the processor 710), such as a booting state, a message state, a charging state, or the like. The motor 798 may convert an electrical signal into a mechanical vibration, and may generate a vibration or haptic effect. Although not illustrated, a processing device (e.g., a GPU) for supporting a mobile TV may be included in the electronic device 701. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 8:
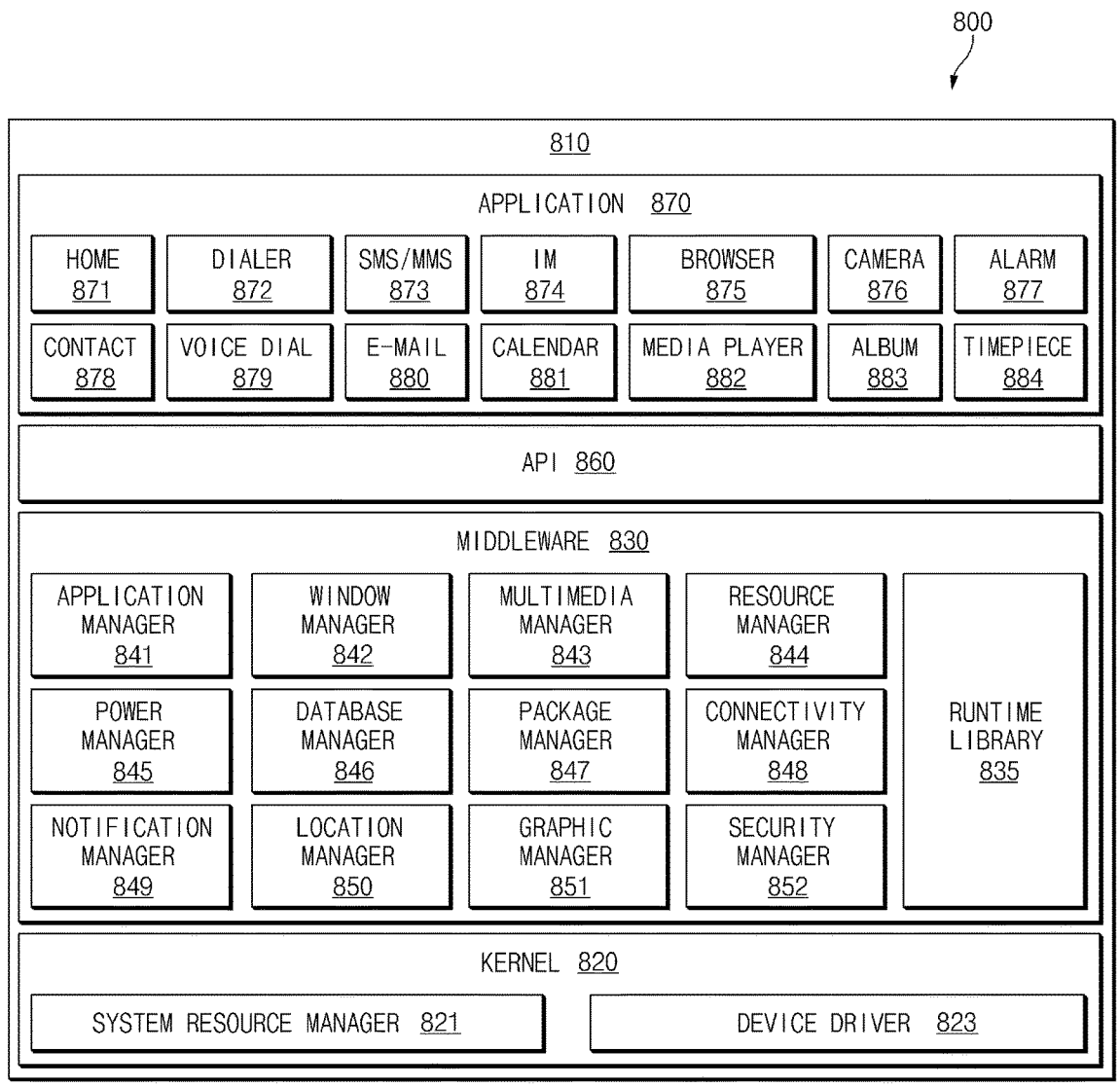
FIG. 8 is a block diagram illustrating an example program module according to an example embodiment of the present disclosure.

FIG. 8 is a block diagram illustrating an example program module according to an example embodiment of the present disclosure.

Referring to FIG. 8, a program module 810 (e.g., the program 640) may include an operating system (OS) for controlling a resource related to an electronic device (e.g., the electronic device 601) and/or various applications (e.g., the application program 647) running on the OS. The operating system may be, for example, Android, iOS, Windows, Symbian, Tizen, or the like.

The program module 810 may include a kernel 820, a middleware 830, an API 860, and/or an application 870. At least a part of the program module 810 may be preloaded on an electronic device or may be downloaded from an external electronic device (e.g., the first electronic device 602, the second external electronic device 604, or the server 606).

The kernel 820 (e.g., the kernel 641) may include, for example, a system resource manager 821 or a device driver 823. The system resource manager 821 may perform control, allocation, or retrieval of a system resource. According to an embodiment of the present disclosure, the system resource manager 821 may include a process management unit, a memory management unit, a file system management unit, or the like. The device driver 823 may include, for example, a display driver, a camera driver, a Bluetooth driver, a shared memory driver, a USB driver, a keypad driver, a Wi-Fi driver, an audio driver, or an inter-process communication (IPC) driver.

The middleware 830, for example, may provide a function that the applications 870 require in common, or may provide various functions to the applications 870 through the API 860 so that the applications 870 may efficiently use limited system resources in the electronic device. According to an embodiment of the present disclosure, the middleware 830 (e.g., the middleware 643) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, and a security manager 852.

The runtime library 835 may include, for example, a library module that a compiler uses to add a new function through a programming language while the application 870 is running. The runtime library 835 may perform a function for input/output management, memory management, or an arithmetic function.

The application manager 841 may mange, for example, a life cycle of at least one of the applications 870. The window manager 842 may manage a GUI resource used in a screen. The multimedia manager 843 may recognize a format required for playing various media files and may encode or decode a media file using a codec matched to the format. The resource manager 844 may manage a resource such as a source code, a memory, or a storage space of at least one of the applications 870.

The power manager 845, for example, may operate together with a basic input/output system (BIOS) to manage a battery or power and may provide power information required for operating the electronic device. The database manager 846 may generate, search, or modify a database to be used in at least one of the applications 870. The package manager 847 may manage installation or update of an application distributed in a package file format.

The connectivity manger 848 may manage wireless connection of Wi-Fi, Bluetooth, or the like. The notification manager 849 may display or notify an event such as message arrival, appointments, and proximity alerts in such a manner as not to disturb a user. The location manager 850 may manage location information of the electronic device. The graphic manager 851 may manage a graphic effect to be provided to a user or a user interface related thereto. The security manager 852 may provide various security functions required for system security or user authentication. According to an embodiment of the present disclosure, in the case in which an electronic device (e.g., the electronic device 601) includes a phone function, the middleware 830 may further include a telephony manager for managing a voice or video call function of the electronic device.

The middleware 830 may include a middleware module for forming a combination of various functions of the above-mentioned elements. The middleware 830 may provide a module specialized for each type of an operating system to provide differentiated functions. Furthermore, the middleware 830 may delete a part of existing elements or may add new elements dynamically.

The API 860 (e.g., the API 645) which is, for example, a set of API programming functions may be provided in different configurations according to an operating system. For example, in the case of Android or iOS, one API set may be provided for each platform, and, in the case of Tizen, at least two API sets may be provided for each platform.

The application 870 (e.g., the application program 647), for example, may include at least one application capable of performing functions such as a home 871, a dialer 872, an SMS/MMS 873, an instant message (IM) 874, a browser 875, a camera 876, an alarm 877, a contact 878, a voice dial 879, an e-mail 880, a calendar 881, a media player 882, an album 883, a timepiece 884, health care (e.g., measure an exercise amount or blood sugar), or environmental information provision (e.g., provide air pressure, humidity, or temperature information).

According to an embodiment of the present disclosure, the application 870 may include an information exchange application for supporting information exchange between the electronic device (e.g., the electronic device 601) and an external electronic device (e.g., the first electronic device 602 or the second external electronic device 604). The information exchange application may include, for example, a notification relay application for relaying specific information to the external electronic device or a device management application for managing the external electronic device.

For example, the notification relay application may have a function for relaying, to an external electronic device (e.g., the first electronic device 602 or the second external electronic device 604), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 602 or the second external electronic device 604) communicating with the electronic device, an application running in the external electronic device, or a service (e.g., a call service, a message service, or the like) provided from the external electronic device.

According to an embodiment of the present disclosure, the application 870 may include a specified application (e.g., a healthcare application of a mobile medical device) according to an attribute of the external electronic device (e.g., the first electronic device 602 or the second external electronic device 604). The application 870 may include an application received from an external electronic device (e.g., the first electronic device 602 or the second external electronic device 604). The application 870 may include a preloaded application or a third-party application downloadable from a server. The names of the elements of the program module 810 illustrated may vary with the type of an operating system.

According to various embodiments of the present disclosure, at least a part of the program module 810 may be implemented with software, firmware, hardware, or a combination thereof. At least a part of the program module 810, for example, may be implemented (e.g., executed) by a processor (e.g., the processor 710). At least a part of the program module 810 may include, for example, a module, a program, a routine, sets of instructions, or a process for performing at least one function.

According to embodiments disclosed in the specification, an approach of a human body may be sensed more exactly by using a conductive line and at least one of a plurality of antennas connected with the conductive line as a sensing area.

The term "module" used herein may refer, for example, to a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, and without limitation, the "module" may include at least one of a dedicated processor, a CPU, an application-specific integrated circuit (ASIC) chip, a field-programmable gate array (FPGA), and a programmable-logic device, or the like, for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 620), the processor may perform functions corresponding to the instructions. The computer-readable storage medium may be, for example, the memory 630.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been illustrated and described with reference to various example embodiments thereof, it will be understood by those skilled in the art that various changes in form and details may be made therein without departing from the scope of the present disclosure. Therefore, the scope of the present disclosure should not be defined as being limited to the various example embodiments, but should be defined by the appended claims and equivalents thereof.

What is claimed is:

1. An electronic device comprising:
a first antenna;
a first feeding line electrically connected to the first antenna;
a second antenna;
a second feeding line electrically connected to the second antenna;
a conductive line connecting a point of the first antenna or the first feeding line and a point of the second antenna or the second feeding line; and
a sensor module electrically connected to a point of at least one of: the first antenna, the second antenna, the first feeding line, the second feeding line, and the conductive line, wherein the sensor module comprises a grip sensor.

2. The electronic device of claim 1, wherein the sensor module is configured to:
determine whether a contact or proximity of a part of a human body to the electronic device is made, based on a change in at least one electrical characteristic of a plurality of electrical characteristics including a capacitance associated with at least one of the first antenna, the second antenna, and the conductive line.

3. The electronic device of claim 1, wherein the first antenna and the first feeding line form an electrical length for transmitting and receiving a signal of a first frequency band, and
wherein the second antenna and the second feeding line form an electrical length for transmitting and receiving a signal of a second frequency band.

4. The electronic device of claim 3, wherein the first frequency band includes at least one frequency band for transmitting and receiving a Wi-Fi signal, and
wherein the second frequency band includes at least one frequency band for transmitting and receiving a GPS signal.

5. The electronic device of claim 3, wherein the first frequency band includes a frequency band lower than the second frequency band.

6. The electronic device of claim 1, wherein at least one circuit element is disposed in the conductive line.

7. The electronic device of claim 6, wherein the at least one circuit element includes an inductor having an inductance value that allows a signal of a frequency that is higher than a specified frequency to be blocked.

8. The electronic device of claim 1, wherein a first inductor is disposed at a point at which the conductive line and the first feeding line are connected, and
wherein a second inductor is disposed at a point at which the conductive line and the second feeding line are connected.

9. The electronic device of claim 8, wherein the first inductor and the second inductor have the same inductance value.

10. The electronic device of claim 1, wherein the first feeding line is connected to a first communication module comprising communication circuitry configured to transmit and receive a signal of a first frequency band, and
wherein the second feeding line is connected to a second communication module comprising communication circuitry configured to transmit and receive a signal of a second frequency band.

11. The electronic device of claim 10, wherein the first communication module is connected to a first matching circuit, and
wherein the second communication module is connected to a second matching circuit.

12. The electronic device of claim 1, wherein the first feeding line and the second feeding line are disposed on a printed circuit board, and
wherein at least one of the first antenna and the second antenna is electrically connected to a ground line connected with a ground of the printed circuit board.

13. An electronic device comprising:
a housing including a first surface facing a first direction, a second surface facing a second direction opposite the first direction, and a side surface at least partially surrounding a space formed between the first surface and the second surface;
a first antenna;
a second antenna;
a first feeding line electrically connected to the first antenna;
a second feeding line electrically connected to the second antenna;
a first communication module comprising communication circuitry and connected to the first feeding line, the first communication module configured to transmit and receive a signal of a first frequency band;
a second communication module comprising communication circuitry and connected to the second feeding line, the second communication module configured to transmit and receive a signal of a second frequency band;
a conductive line connecting a point of the first feeding line and a point of the second feeding line;
a printed circuit board disposed inside the housing;
a sensor module disposed on the printed circuit board and electrically connected to a point of the conductive line; and
a processor disposed on the printed circuit board and operatively connected with the sensor module.

14. The electronic device of claim 13, wherein the sensor module is configured to determine whether a contact or proximity of a part of a human body to the electronic device is made, based on a change in capacitance associated with at least one of the first antenna, the second antenna, and the conductive line, and
wherein the processor is configured to reduce power being supplied to the first antenna and the second antenna based on the result of determining whether the contact or proximity of the part of the human body is made.

15. The electronic device of claim 13, wherein the housing includes a conductor comprising a conductive element disposed in at least a partial area of the housing, and
wherein at least one of the first antenna and the second antenna includes at least part of the conductive element.

16. The electronic device of claim 13, wherein at least one circuit element is disposed in the conductive line.

17. The electronic device of claim 13, wherein a first inductor is disposed at a point which is connected with the first feeding line of the conductive line, and wherein a second inductor is disposed at a point which is connected with the second feeding line of the conductive line.

18. The electronic device of claim 13, wherein the first communication module is connected to a first matching circuit, and
wherein the second communication module is connected to a second matching circuit.

19. The electronic device of claim 13, wherein at least one of the first antenna and the second antenna is electrically connected to a ground line connected to a ground of the printed circuit board.

* * * * *